US012763475B2

(12) United States Patent
Rodriguez Varela et al.

(10) Patent No.: US 12,763,475 B2
(45) Date of Patent: Oct. 13, 2026

(54) ANTENNA DEVICE

(71) Applicant: HUBER+SUHNER AG, Herisau (CH)

(72) Inventors: Fernando Rodriguez Varela, Herisau (CH); Alejandro Garcia Tejero, St. Gallen (CH); Pietro Romano, Rorschach (CH); Francesco Merli, St. Gallen (CH)

(73) Assignee: HUBER+SUHNER AG, Herisau (CH)

(*) Notice: Subject to any disclaimer, the term of this patent is extended or adjusted under 35 U.S.C. 154(b) by 5 days.

(21) Appl. No.: 18/717,229

(22) PCT Filed: Dec. 7, 2022

(86) PCT No.: PCT/EP2022/084791
§ 371 (c)(1),
(2) Date: Jun. 6, 2024

(87) PCT Pub. No.: WO2023/117427
PCT Pub. Date: Jun. 29, 2023

(65) Prior Publication Data

US 2025/0038417 A1 Jan. 30, 2025

(30) Foreign Application Priority Data

Dec. 23, 2021 (CH) ................................ 70791/2021

(51) Int. Cl.
*H01Q 13/02* (2006.01)
*H01Q 13/06* (2006.01)
*H01Q 15/24* (2006.01)

(52) U.S. Cl.
CPC ............ *H01Q 13/06* (2013.01); *H01Q 13/02* (2013.01); *H01Q 15/24* (2013.01)

(58) Field of Classification Search
CPC ........ H01Q 13/06; H01Q 13/02; H01Q 15/24; H01Q 21/005; H01Q 21/064; H01Q 21/28;
(Continued)

(56) References Cited

U.S. PATENT DOCUMENTS 4,435,715 A 3/1984 Ajioka et al.
5,170,174 A 12/1992 Caer et al.
(Continued)

FOREIGN PATENT DOCUMENTS

JP 2013-187752 A 9/2013
JP 2016-152451 A 8/2016
(Continued)

OTHER PUBLICATIONS

EPO (Rijswijk, NL), English version of the International Search Report, Form PCT/ISA/210, for corresponding International Application PCT/EP2022/084791, Mar. 24, 2023 (4 pp.).
(Continued)

*Primary Examiner* — Awat M Salih
(74) *Attorney, Agent, or Firm* — Pauley Erickson & Swanson

(57) ABSTRACT

An antenna device includes an antenna plate having a front face and a back face and at least one waveguide channel segment having a front section and a back section arranged in the antenna plate extending in a first direction (x) parallel to the front face in the antenna plate. Waveguide apertures are arranged in the antenna plate extending between and interconnecting the front section of the waveguide channel segment and the front face of the antenna plate, wherein the front section and/or the back section comprise indentations in the form of protrusions extending from a channel wall into the front section and/or the back section of the waveguide channel segment and wherein the waveguide apertures in the
(Continued)

region of their rear end have a cross-section with a longer extension and a shorter extension.

19 Claims, 12 Drawing Sheets

(58) Field of Classification Search
CPC ....... H01Q 1/3233; G01S 7/024; G01S 7/032; G01S 13/42; G01S 13/931
See application file for complete search history.

(56) References Cited

U.S. PATENT DOCUMENTS

| | | | | |
|---|---|---|---|---|
| 5,380,386 | A | 1/1995 | Oldham et al. | |
| 5,422,652 | A | 6/1995 | Caer et al. | |
| 10,193,225 | B2 | 1/2019 | Izadian et al. | |
| 10,218,075 | B1 | 2/2019 | Smith | |
| 10,566,701 | B2 | 2/2020 | Isadian | |
| 10,651,560 | B2 | 5/2020 | Roemer et al. | |
| 10,756,417 | B2 | 8/2020 | Isadian | |
| 2012/0028549 | A1 | 2/2012 | Tsai et al. | |
| 2012/0321246 | A1 | 12/2012 | Pomerene et al. | |
| 2013/0321229 | A1 | 12/2013 | Klefenz et al. | |
| 2015/0229027 | A1* | 8/2015 | Sonozaki | H01Q 21/005 343/771 |
| 2017/0271776 | A1* | 9/2017 | Biancotto | H01Q 21/064 |
| 2018/0301815 | A1* | 10/2018 | Kamo | G01S 13/931 |
| 2019/0081412 | A1 | 3/2019 | Hugel et al. | |
| 2019/0148840 | A1 | 5/2019 | Kirino et al. | |
| 2019/0187247 | A1 | 6/2019 | Izadian et al. | |
| 2020/0127358 | A1 | 4/2020 | de Rijk et al. | |
| 2020/0185802 | A1 | 6/2020 | Vilenskiy et al. | |
| 2020/0287263 | A1 | 9/2020 | Tsumuraya et al. | |
| 2020/0313304 | A1 | 10/2020 | Glogowski | |
| 2020/0365976 | A1 | 11/2020 | Izadian | |
| 2021/0013621 | A1 | 1/2021 | Nakamoto et al. | |
| 2021/0072344 | A1 | 3/2021 | Izadian et al. | |
| 2023/0420857 | A1 | 12/2023 | Garcia Tejero et al. | |
| 2024/0136723 | A1 | 4/2024 | Garcia Tejero et al. | |

FOREIGN PATENT DOCUMENTS

| | | | |
|---|---|---|---|
| JP | 2018-61261 | A | 4/2018 |
| JP | 2021-507579 | A | 2/2021 |
| WO | WO 2017/167916 | A1 | 10/2017 |
| WO | WO 2020/188093 | A1 | 9/2020 |

OTHER PUBLICATIONS

Huber+Suhner AG, "An antenna concept that addresses the challenges with automotive radars," IWPC-Trends in Automotive Radar and Impact on System Architecture, Mar. 15, 2016, Audi, Munich , Germany (11 pages).

Huber+Suhner AG, "Injection Molded Radar Antennas," IWPC-New Features for Automotive Radars, 2018, Febraury 1, Daimier, Stuttgart, Germany (15 pages).

D. Dogan & Ö.A. Civi, "Edge Wall Slotted Waveguide Atenna with Low Cross Polarization," IEEE Antennas and Propagation Society International Symposium, Jul. 11-17, 2010, Toronto, Ontario, Canada (4 pages).

T. Li & W. Dou, "Design of an Edge Slotted Waveguide Antenna Array Based on T-Shaped Cross-Section Waveguide," Int'l J. of Antennas & Propagation, 2017, vol. 2017, Article ID 7385357 (8 pages).

E. Garcia-Marin et al., "Bow-tie-Shaped Radiating Element for Single and Dual Circular Polarization," IEEE Transactions on Antennas and Propagation, Feb. 2020, vol. 68, No. 2, pp. 754-764.

G.P. Le Sage, "3D Printed Waveguide Slot Array Antennas," IEEEE Access, Mar. 21, 2016, vol. 4, pp. 1258-1265, doi: 10.1109/ACCESS.2016.2544278.

JPO, Japanese Office Action for Japanese Patent Application No. JP 2024-536986, Jul. 28, 2026 (6 pages)—English Translation Only.

* cited by examiner

ANTENNA DEVICE

CROSS REFERENCE TO RELATED APPLICATION

This application is a National Phase filing in the United States, under 35 USC § 371, of PCT International Patent Application PCT/EP2022/084791, filed on 7 Dec. 2022 which claims the priority of Swiss Patent Application No. CH 070791/2021, filed 23 Dec. 2021.

The above-referenced applications are hereby incorporated by reference herein in their entirety and are made a part hereof, including but not limited to those portions which specifically appear hereinafter.

BACKGROUND OF THE INVENTION

Field of the Invention

The present disclosure relates to an antenna device for use in automotive radar applications.

Discussion of Related Art

U.S. Pat. No. 5,170,174 A, published on 8 Dec. 1992 by Thomson CSF relates to a patch-excited non-inclined radiating slot waveguide wherein the waveguide has slots perpendicular to the axis of the waveguide which are cut in a narrow wall of the waveguide and a printed circuit plate. The plate has patches for coupling with the energy which is propagated in the waveguide and microstrip lines connected to the patches to excite the slots with the energy thus tapped. These slot waveguides can be used particularly in array antennas U.S. Pat. No. 4,435,715 A published on 6 Mar. 1984 by Hughes Aircraft Co. relates to a rod-excited waveguide slot antenna, which power-radiating slotted waveguide comprises one or more rods mounted inside the waveguide adjacent a non-inclined slot. The rod causes power to be radiated and because the slot is non-inclined, undesirable cross-polarized radiation is minimized. The energy radiated from the slot can be varied by varying the area between the rod and the waveguide walls.

U.S. Pat. No. 5,422,652 A: published on 6 Jun. 1995 by Thomson CSF relates to a waveguide with non-inclined radiating slots excited by flat metal plates, which waveguide has slots perpendicular to the axis of the waveguide, cut out in a narrow wall of the waveguide, there are positioned, on each side of each slot, pairs of metal flat plates symmetrical with respect to the central axis of the slot. These flat plates modify the electrical field at the associated slot and make it possible to excite it, the value of the coupling being set by the adjusting of the size of the flat plates and of their position with respect to the corresponding radiating slot.

SUMMARY OF THE INVENTION

The herein described antenna devices are designed as Multi-Input-Multi-Output (MIMO) antennas, e.g. for radar applications in automotive applications. Such antenna devices typically require individual antenna elements and/or waveguide channel segments which are configured for sending and/or receiving signals simultaneously and/or according to a specific pattern. Depending on the field of application, preferred variations of the antenna device may comprise at least two individual waveguide channel segments. The at least two individual waveguide channel segments can be operated independently from each other.

Especially for automotive applications typically a vertical polarization of the radiated signal is desired. In known antenna devices with a waveguide structure, a vertical polarization is usually implemented by arranging the waveguide apertures angularly displaced with respect to the main extension direction of the waveguide channel segments. In order to be able to excite a signal through the waveguide apertures, at least some part of the waveguide propagating currents must be oriented essentially perpendicular to the orientation of the waveguide apertures. Therefore, the waveguide apertures of the known antenna devices are typically angularly displaced such that they can radiate a signal. However, this creates an undesired partial horizontal polarization of the radiated signal.

Alternatively, for certain applications also a horizontal polarization of the excited signal can be required. A horizontal signal is typically excited from known antenna devices, by placing the waveguide apertures parallel to the main extension direction of the waveguide channel segment. Unlike the previous case, the neighboring waveguide apertures must be spaced with one guided wavelength distance with respect to each other to keep a uniform phase between neighboring waveguide apertures. As a result, to be able to place a sufficient number of waveguide apertures to be able to also realize more complex radiation patterns, the waveguide channel segments need to be comparatively long, which results in an undesired size of the overall antenna device.

One objective which is addressed by the present disclosure can be seen in influencing the field and current characteristics of the signal within the waveguide channel segment to obtain a space saving design with a high accuracy of the antenna directivity.

An antenna device according to the present disclosure typically comprises an antenna plate having a front face and a back face. The disclosed antenna device can be part of an antenna assembly which typically comprises the antenna device, a printed circuit board and a thereon arranged electronic component which is interconnected to the antenna plate. To keep the manufacturing costs low in view of the vast quantities, it is desirable to design antenna devices that comprise no more than two stacked layers (parts). Good results can be achieved when the antenna plate comprises a back part and front part, wherein the back part and the front part are interconnected to each other along a front face of the back part and a back face of the front part. The front face of the back part and a back face of the front part do not have to be essentially flat. If appropriate, the front part and/or the back part can be skeletonized to reduce a contact surface. This is advantageously as the minimized contact area increases the surface pressure of the contact area and therefore results in a more accurate alignment of the front and the back part in the area of the waveguide channel and/or a waveguide channel segment. Usually, the two parts are assembled together, wherein a part of the waveguide channel segment is arranged in the front face of the back part and a part of the waveguide channel segment is arranged in the back face of the front part, which are aligned congruently. The back part and/or the front part can be made by injection molding of at least one plastic material. An advantageous construction can be achieved, when at least one waveguide channel and/or a waveguide channel segment extends at least partially in the front face of the back part and/or the back face of the front part.

To even further reduce the manufacturing effort, the antenna plate can also be designed as a single layered antenna plate with an electromagnetic band gap structure (EBG). Instead of combining two metallized plastic layers, the antenna plate can comprise only one metallized plastic layer, interconnected to a printed circuit board (PCB). To assemble the antenna plate and the PCB together and avoid leakage of power, there are different alternative ways. E.g. conductive glue, soldering, etc.

In a preferred variation, the antenna plate can consist of only one layer, wherein a number of pillars are arranged at the back face of the antenna plate, which are configured to define at least part of the contour of the waveguide channel segment. An EBG structure as mentioned before implies that the antenna plate is not flat respectively planar, but is structured, e.g. corrugated respectively recessed, with the EBG elements projecting away from the generally flat respectively planar back face of the antenna plate. Such a design allows connecting the antenna plate to a flat respectively planar PCB. The font part and/or the back part may preferably at least partially comprise pillars at least partially forming the outer contour of the waveguide channel segment. As said above the font part and the back part can be made integrally as a single layered antenna plate. The pillars are typically configured to guide the signal through the waveguide channel segment. The EBG structures are arranged essentially around the hollow waveguide channel segments. An electromagnetic band gap structure allows to block electromagnetic waves at a given range of frequencies, behaving as a conductive wall without the need to have direct and/or ohmic contact between the antenna plate and the PCB, thereby still implementing a waveguide structure. Alternatively, or in addition, the antenna plate can consist of only one flat respectively planar layer, wherein a printed circuit board is interconnected to the antenna plate comprising mushroom-shaped electromagnetic band gap elements. The mushroom-shaped electromagnetic band gap elements may for example extend from the back face of the PCB and/or through the body of the PCB. The mushroom-shaped electromagnetic band gap elements can be arranged in between, respectively around the PCB waveguide passages, thereby improving the electromagnetic isolation respectively decoupling.

A preferred antenna device according to the present disclosure usually comprises at least one waveguide channel segment which has a front section and a back section which are preferably arranged in the antenna plate. The cross-section of the waveguide channel segment is typically essentially rectangular. In case that the antenna plate is made by injection molding, the edges of the waveguide channel segment can be designed slightly inclined such that the antenna plate can be demolded from the mold more easily. To improve the radiation efficiency, the front section can have a bigger cross-section than the back section. Therefore, front and back section can be symmetrically with respect to a parting plane. In a variation with an antenna plate comprising a front and a back layer, the parting plane between the front and the back layer can divide the waveguide channel segment in two halves. As the thickness of the front and the back layer may differ, the half of the front section and the half of the back section may be symmetrically with respect to the parting plane. The waveguide channel segment within the antenna plate typically extends in a first direction parallel to the front face of the antenna plate. The first direction typically corresponds to the main extension direction of the waveguide channel segment. In a preferred variation the waveguide channel segment comprises a cross section out of the group of the following geometries or a combination thereof: Rectangle, rhomb, ellipse, circle, wherein a main extension direction of the cross section is essentially perpendicular to the first direction.

For radiating an outgoing or receiving an incoming signal, the antenna device comprises waveguide apertures which are usually arranged in the antenna plate. The waveguide apertures typically extend between and interconnect the front section of the waveguide channel segment and the front face of the antenna plate. Typically, several waveguide apertures extend between and interconnect the front section of one waveguide channel segment and the front face forming an array of waveguide apertures. The waveguide apertures of an array are preferably arranged in a line. The waveguide apertures of an array are usually energized by a common waveguide channel which is interconnected to a respective radiating element usually at the back side of the antenna device. In certain constellations it would be possible to arranged the radiating element and the thereto related opening at a side of the antenna device. Depending on the design, the waveguide apertures of the array are configured to radiate and/or receive a signal. Typically, the waveguide apertures can be designed as slots. Depending on the field of application, the radiating openings may have different geometries as will become apparent from the variations shown hereinafter in more detail. Usually, the waveguide apertures have a cross-section with a longer extension and a shorter extension in the region of their rear end. The rear end is the end adjacent to the waveguide channel segment, whereas the front end is the end facing the front face of the antenna plate. In a preferred variation the waveguide apertures have an essentially rectangular cross-section, wherein the waveguide apertures can have a funnel shaped design with a narrowing cross-section in an inward direction before they merge into the waveguide channel segment or a section thereof.

In addition, the antenna device can comprise scattering elements which are arranged adjacent to the waveguide apertures. Rays which impact in the area of the scattering elements can at least be partially reflected by the scattering elements and thereby separated into first secondary rays and second secondary rays. The first secondary rays and the second secondary rays are different such that they cancel out each other at least partially by interference. Favorably the scattering elements are designed as protrusions and/or indentations or a combination thereof, which are arranged at the front face. Depending on the design, the depth of the at least one indentation may be linked to the specific phase distribution that is targeted to obtain a reflection that cancels out the rays reflected in an unwanted manner by interference. The phase change is typically induced by the reflection on the bottom surface of the at least one indentation. Good results can be achieved, when the bottom surface of the at least one indentation is an essentially planar surface which is arranged essentially parallel with respect to the front face of the antenna plate. Preferably the scattering elements are having in the front face a layout (footprint) which is at least one element out of the group of the following elements or a combination thereof: rectangle, square, circle, ellipse, C-shaped, ring-shaped, S-shaped. The scattering elements can be designed with a single polarization (rectangular, elliptical, s-shaped, c-shaped) or with multiple polarizations (squared/circular/ring). The at least one indentation has a layout which is related to the working operating frequency and the polarization of the electromagnetic waves.

In a preferred variation the waveguide apertures comprise longitudinally shaped openings with half a guided wavelength spacing with respect to each other. Such an arrangement is necessary, given the particular distribution of the electric currents that would excite the openings out of phase if they were, for instance, placed with a shorter distance with respect to each other. Having the openings aligned collinear or in line with respect to each other with the longer extension being arranged perpendicular with respect to a first axis, however, represents an advantage. It allows to realize a uniform phase orientation of the excited signal and avoids unwanted lobes outside of the main radiation planes.

The front section and/or the back section of the waveguide channel segment can comprise indentations in the form of protrusions extending from a channel wall into the front section and/or the back section of the waveguide channel segment. Good results can be achieved when the indentations are designed as inwardly directed protrusions or alternatively in form of a septum which is arranged in the channel wall. The indentations can be configured to help dividing the signal between the left and the right section of the waveguide channel segment and/or to perturb the field. Good results can be achieved when between neighboring waveguide apertures alternately first protrusions are arranged in the front section of the waveguide channel segment. The first protrusions can have a trapezoid cross-section. Said first protrusions can be configured to perturb the field such that the signal is radiated vertically polarized. By arranging the longer extension of the cross-section perpendicular to the first direction, the waveguide apertures would usually not excite a signal. In order to excite a signal from the waveguide aperture, the front section comprises the alternately arranged first protrusions. Preferably the first protrusions can be wedge shaped. The multiple alternately arranged first protrusions create a shape of the front section of the waveguide channel segment which is essentially shaped like a saw blade. The first protrusions perturb the currents such that the waveguide apertures can radiate a signal. The first protrusions can be arranged alternately configured to compensate the 180° phase change between neighboring waveguide apertures, which are arranged at the waveguide channel segment separated with half a guided wavelength distance.

In a preferred variation of the antenna device, the longer extension of the cross-section may be arranged perpendicular to the first direction and the shorter extension may be arranged parallel to the first direction. Preferably the cross section of the waveguide aperture is essentially rectangular. As the waveguide aperture radiation coupling is proportional to the size of the first protrusions, their shape can be varied to tune the amplitude of the waveguide apertures and influence their radiation pattern. The depth of the indentations can control the waveguide aperture radiation. Alternatively, or in addition, the length of the longer extension can be adjusted to alter the excitation phase of the waveguide aperture, which can be useful for tuning the radiation pattern.

The radiation pattern of the waveguide apertures can be adjusted in the elevation plane tuning the number of waveguide apertures or by influencing the size, and shape of the first protrusions. The first protrusions are configured to compensate a 180° phase change between adjacent waveguide apertures, which are arranged with a distance of essentially half a guided wavelength with respect to each other. Nevertheless, the azimuth plane becomes invariant to these changes, showing a wide beamwidth due to the low directivity of the individual waveguide apertures. In a preferred variation the azimuth pattern can be tuned by arranging a cavity on top of the waveguide aperture which focuses the fields and reduces the azimuth beamwidth. Depending on the height and width of the cavity, different patterns can be obtained. In the case of the elevation plane, the cavity has small effect, though it can help to reduce the beamwidth too. In a preferred variation a funnel shaped horn cavity is arranged at the front end of the waveguide apertures configured to tune the radiation pattern to focus the field and to reduce the beamwidth in one of the main radiation planes. Alternatively, or in addition to the horn cavity can be laterally displaced to influence the directivity.

Besides the first protrusions which are typically arranged in the front section of the waveguide channel segment, alternatively or additionally, at least one second protrusion having a rectangular cross-section can be arranged in the front section of the waveguide channel segment. The at least one second protrusion is configured to divide the signal in the waveguide channel segment to excite in a left section and a right section extending along the first direction. Depending on the distribution to be achieved, the second protrusion can have a cross section which is rectangular, which is typically arranged centered between the left and the right section of the waveguide channel segment, such that the signal is split equally between the left and the right section of the waveguide channel segment. If appropriate, the second protrusion can be a necking which is arranged with respect to a center point between the left and the right section of the waveguide channel segment. When the necking is arranged with an offset to one side between the left and the right section, the signal, respectively its power, is split non-equally between the left and the right section. Due to the performance advantages of the herein described arrangement, the splitting of the power is almost lossless. Only a negligible amount of power is lost during the splitting.

Alternatively, or in addition, a polarization element can be arranged at a front end of each waveguide aperture which is configured to split the field into two orthogonal polarizations with a relative 90° phase shift. The polarization element can be designed to create a circular polarization. The polarization element is typically configured to twist the vertical polarized field which is excited by the waveguide aperture by transforming the vertical polarization of each waveguide aperture into circular polarization. The first protrusions arranged at the front section of the waveguide channel segment is still required such that the waveguide apertures can excite and couple the energy to the polarization element with the desired relative amplitude. The shape of the polarizer is optimized to minimize the axial ratio. In a preferred variation the polarization element may be essentially shaped like two diagonally partially overlapping squares or a bow tie.

In an alternative variation the longer extension of the cross-section is arranged parallel to the first direction and the shorter extension is arranged perpendicular to the first direction. In known antenna devices the waveguide apertures are usually spaced with one guided wavelength distance with respect to each other to keep a uniform phase between the waveguide apertures. The distance between two neighboring waveguide apertures is typically equivalent to more than one free space wavelength leading to excessive grating lobe levels. Third protrusions can be arranged between the waveguide apertures alternately in the back section of the waveguide channel segment with respect to the first direction, wherein the third protrusions are configured to compress the guided wavelength in the first direction within the waveguide channel segment. The third protrusions can reduce the effective wavelength of the waveguide propagating mode. Therefore, the distance between neighboring waveguide apertures can be reduced and mitigate the appearance of undesired grating lobes.

The third protrusions are preferably designed as pillars extending perpendicular to the front face of the antenna plate into the waveguide channel segment, and spaced apart from each other in the first direction in an, in one-dimension glide-symmetric arrangement and the waveguide apertures are arranged with a distance of essentially one guided wavelength to one another along the first direction. The number of pillars arranged at the back section of the waveguide channel segment creates a dented profile. The third protrusions can introduce a periodic structure such that the propagation constant inside the waveguide is increased. This allows to divide the guided wavelength with a factor of roughly two compared to the incoming wavelength. In a third preferred variation every second of a third protrusion is folded upward by mirroring at a parting plane as a fourth protrusion in the front section, such that in two dimensions a glide-symmetric arrangement of the third and the fourth protrusions results. Typically, the protrusions are in form of pillars having a width between essentially 0.2 times the wavelength up to 0.3 times the wavelength. In a preferred variation the third pillars are arranged at the back section and have a height between essentially 0.3 times the wavelength up to 0.5 times the wavelength. In a fourth preferred variation the rectangular cross-section is arranged angularly displaced by an angle $\alpha$ with respect to the first direction of the waveguide channel segment. The polarization can be changed from pure horizontal) (0° or vertical) (90° polarization to a to slant) (±45° polarization. The polarization is preferably twisted by modified first protrusions, such that a smooth transition is achieved. The advantage of the shown variation is that the polarization can be changed without an additional antenna layer. The use of slant polarization is of high interest in automotive applications because it reduces interference between vehicles that are facing each other. Therefore, between neighboring waveguide apertures alternately first and second protrusions can be arranged in the front section of the waveguide channel segment. Alternatively, or in addition, third protrusions may be arranged between waveguide apertures or alternately in the back section of the waveguide channel segment with respect to the first direction.

In a preferred variation a feeding port interconnects the waveguide channel segment to an aperture at the back face of the antenna plate. Side feeding can lead to a very compact design but the asymmetry reduces the bandwidth and generates beams squint. Therefore, the feeding port can be designed as a splitter which is arranged between the left and the right section of the waveguide channel segment, configured to separate or combine the signal. Center feeding via a splitter offers similar performance as side feeding, but allows the routing to be in the same layer, but it is less compact. Bottom feeding: leads to very compact and broadband design but requires an additional layer of routing below. Hybrid feeding: in some cases it may not be possible to feed the radiator from the center due to small separation with the neighboring elements. Depending on the antenna arrangement, a hybrid solution may be feasible in which the antenna is fed from the center but with a given offset as shown in FIG. 12. This solution also shows reduced beamwidth with respect to the center/bottom feeding and beam squint, but to a lesser extent than the side feeding since some symmetry of the design is recovered. Incoming power received by the waveguide apertures can be also combined by the splitter. Therefore, the splitter may also be configured to also work reciprocal to function as a coupler. The received signals can be combined to one signal.

In case that more directive or complex radiation patterns are required, multiple arrays of waveguide apertures can be arranged in the front face of the antenna plate.

In a preferred variation a feeding port designed as a splitter is arranged between a first column and a second column, configured to separate or combine the signal. Depending on the number of columns, the feeding port can comprise an array of splitters, which are interconnected to each other and are arranged parallel with respect to each other. This design is known as corporate network. The corporate network is designed in a manner such that both columns are fed with a phase and amplitude for the specific radiation pattern. In an alternative variation, the feeding port is designed as a central feeding channel, wherein a number of left and right sections of multiple waveguide channel segments are arranged essentially perpendicular with respect to the central feeding channel and parallel with respect to each other.

Alternatively, or in addition, the waveguide apertures of the two rows can have varying cross sections to further tilt the radiation pattern. The difference between the cross-section of the waveguide apertures can create a phase difference between the radiation of each aperture. The phase difference can cause a tilt in the radiation of the pattern. The impact of the lateral displacement can create local maxima in the antenna directivity. These local maxima can help to focus the antenna energy in certain areas. The tilted pattern can be useful to have a further range in given areas of the radar. Particularly in automotive applications the tilted pattern makes it possible to have a locally wider range. Alternatively, the proximal left and right sections and distal left and right sections may be arranged at the central feeding channel, wherein the distal left and right sections are fed with a phase shift such that a beam tilt is created.

Alternatively, or in addition, the first and second columns of arrays can be arranged adjacent to a central feeding channel. In a preferred variation the first and second columns of arrays are arranged essentially perpendicular with respect to the central feeding waveguide channel. Preferably the distal second columns are fed with a phase shift. The phase shift can create high directive and non-tilted radiation patterns. The feeding port can be designed as a central feeding channel, wherein a number of left and right sections of multiple waveguide channel segments are arranged essentially perpendicular with respect to the central feeding channel and parallel with respect to each other. In a preferred variation two arrays of waveguide apertures are arranged parallel with respect to each other. Preferably the cross sections of the waveguide apertures of the first array are smaller and/or larger than the cross sections of the openings of the second array. This configuration causes a tilt of the radiation pattern. Alternatively, the cross sections of neighboring waveguide apertures within one array can be different, such that a waveguide aperture with a smaller cross section is arranged adjacent to a waveguide aperture with a larger cross section. Alternatively, waveguide apertures with smaller and larger cross sections may be arranged in a line next to each other in alternating manner. This can cause the radiation pattern to be compensated and radiate in a straight manner.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
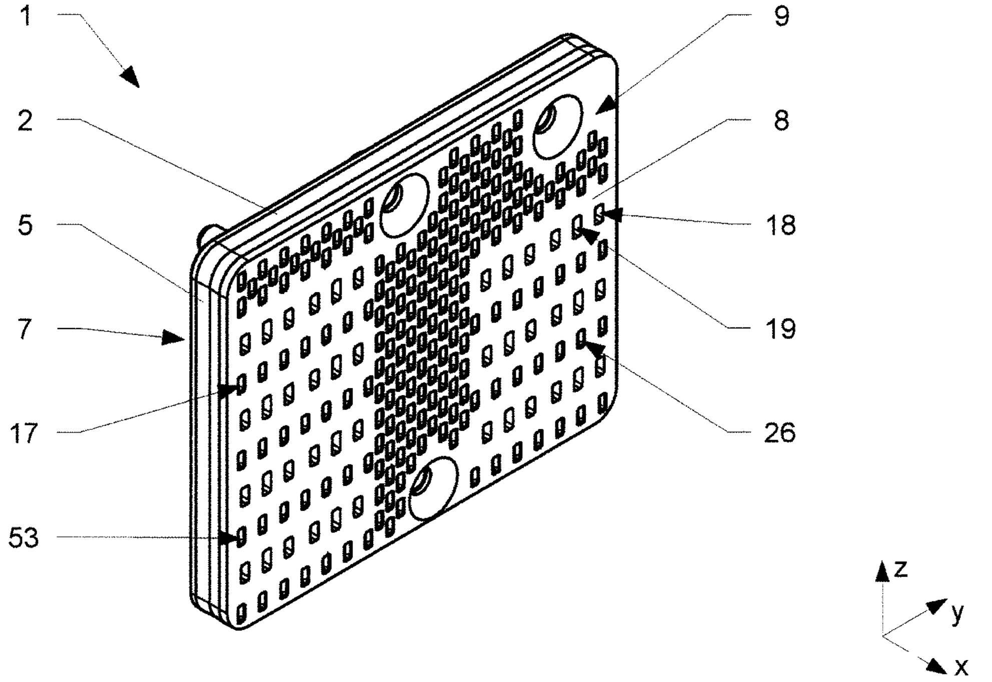
FIG. 1 shows a perspective view of a first variation of the antenna device from the front and above.
Figure 2:
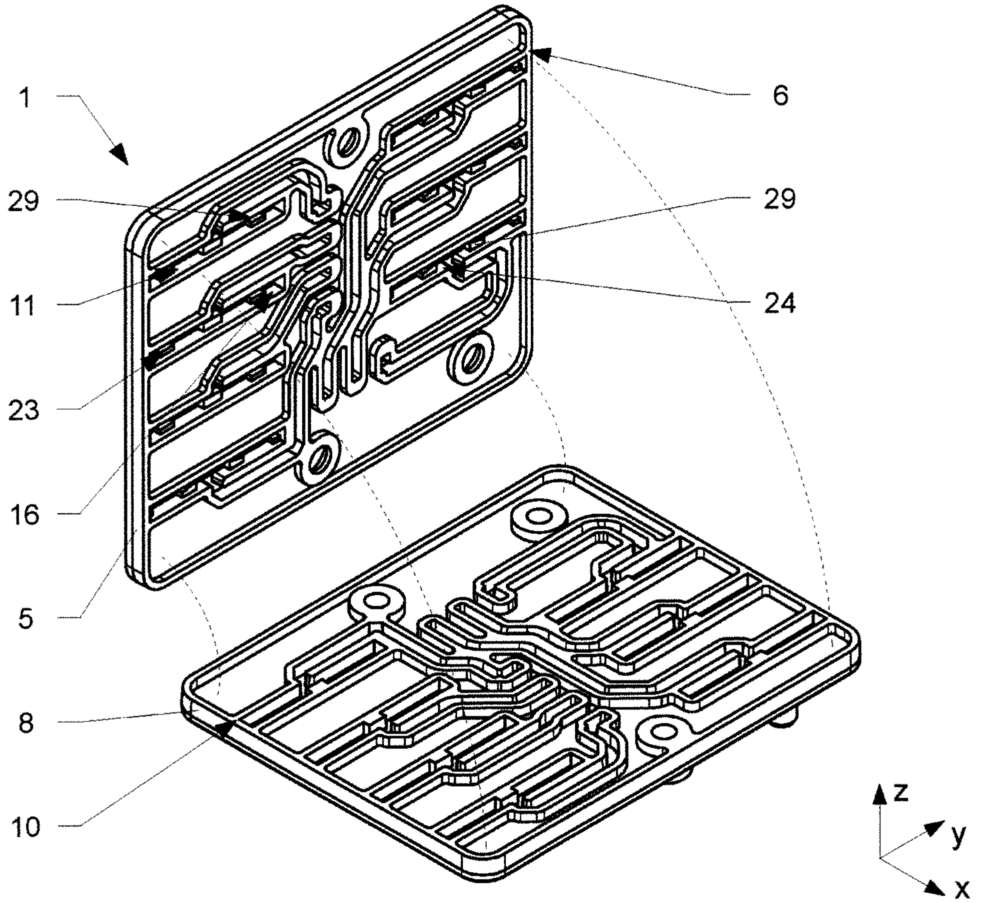
FIG. 2 shows a perspective view of the antenna device according to FIG. 1 in an unfolded view from the front and above.

FIGS. 1 and 2 show a perspective view of a first variation of the antenna device 1 from the front and above, which comprises an antenna plate 2 having a front face 3 and a back face 4. The shown antenna device 1 comprises an antenna plate 2 with two stacked layers (parts). The shown variation comprises a back part 5 and a front part 8, wherein the back part 5 and the front part 8 are interconnected to each other along a front face 6 of the back part 5 and a back face 10 of the front part 8. The front face 6 of the back part 5 and a back face 10 of the front part 8 do not have to be essentially flat as in the shown variation. To reduce the contact surface, the shown front part 8 and the back part 5 are skeletonized. This is advantageously as the minimized contact area increases the surface pressure of the contact area and therefore results in a more accurate alignment of the front 8 and the back part 5 in the area of the waveguide channel segment 11. Usually, the two parts 5, 8 are assembled together, wherein the channel in the front face 6 of the back part 5 and the channel in the back face 10 of the front part 8 are aligned congruently. The shown back part 5 and the front part 8 are made by injection molding of at least one plastic material. The shown antenna device 1 further comprises at least one waveguide channel segment 11 having a front section 13 and a back section 14 arranged in the antenna plate 2 extending in a first direction x parallel to the front face 3 in the antenna plate 2. The shown waveguide apertures 17 arranged in the antenna plate 2 extend between and interconnecting the front section 13 of the waveguide channel segment 11 and the front face 3 of the antenna plate 2. The shown antenna device 1 can be part of an antenna assembly 45, comprising the antenna device 1 and a printed circuit board (PCB) 46 and a thereon arranged electronic component 49 interconnected to the antenna plate 2.

In addition, the shown antenna device 1 comprises scattering elements 53 which are arranged adjacent to the waveguide apertures 17. Rays which impact in the area of the scattering elements 53 can at least be partially reflected by the scattering elements 53 and thereby separated into first secondary rays and second secondary rays. The first secondary rays and the second secondary rays are different such that they cancel out each other at least partially by interference. In the shown variation the scattering elements 53 are with respect to the front face designed as indentations. Depending on the design, the depth of the indentations may be linked to the specific phase distribution that is targeted to obtain a reflection that cancels out the rays reflected in an unwanted manner by interference.

Figure 3:
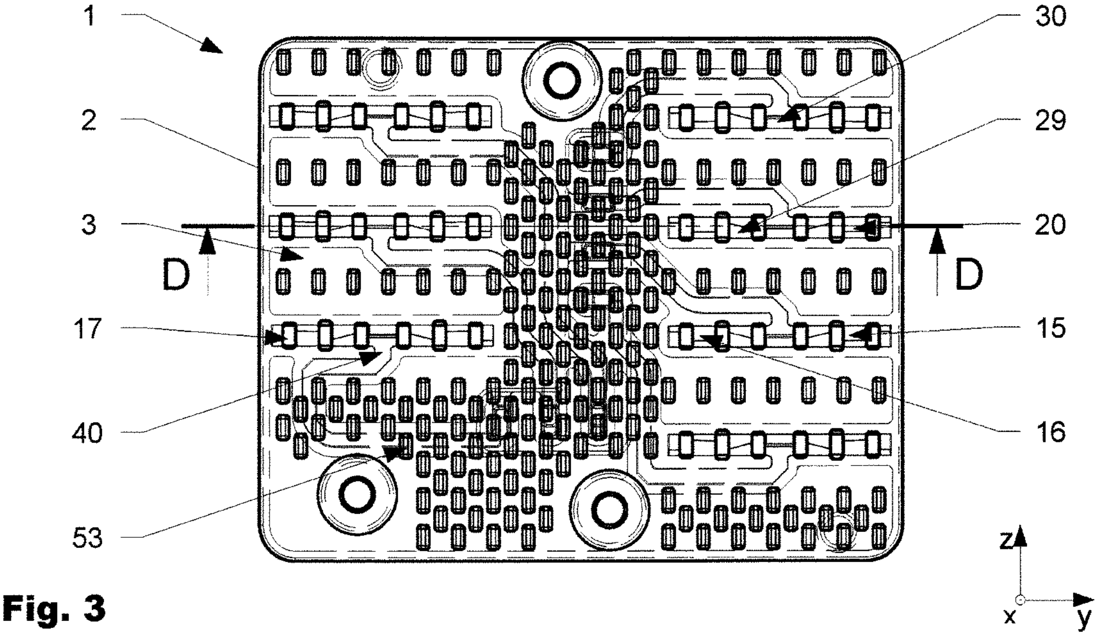
FIG. 3 shows a front view of the antenna device according to FIG. 1.
Figure 4:
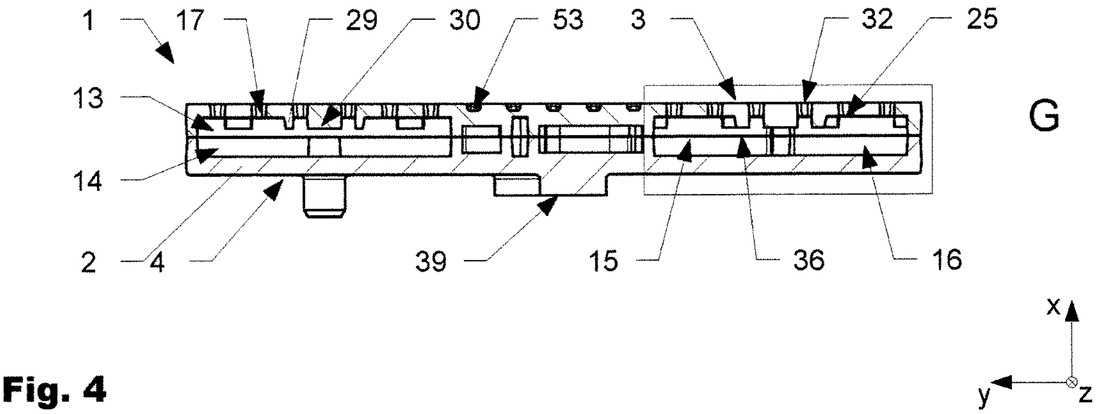
FIG. 4 shows a sectional view of the antenna device according to FIG. 3.
Figure 5:
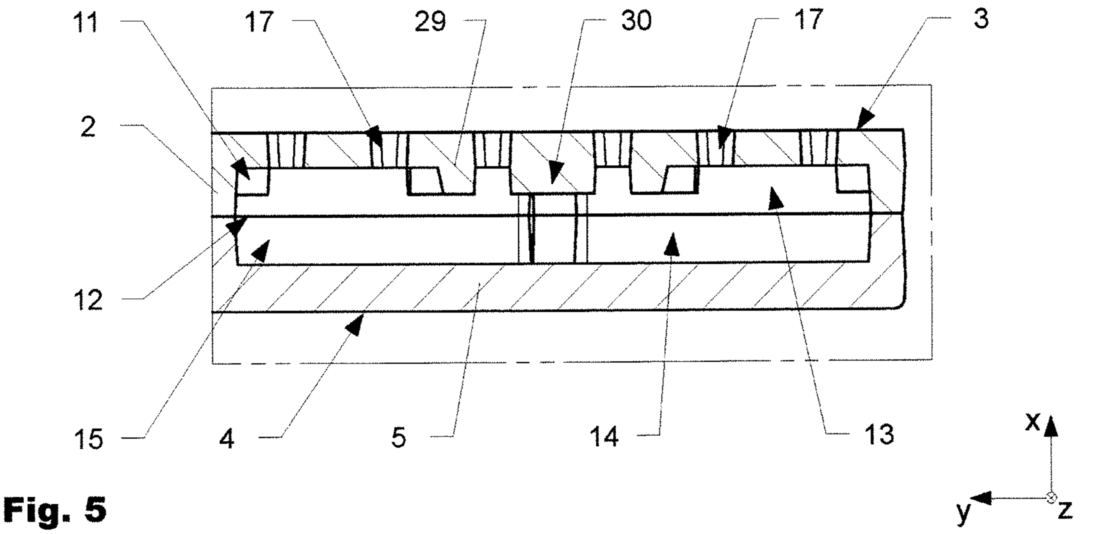
FIG. 5 shows an enlarged view of a section of the antenna device according to FIG. 4.

As can best seen in FIGS. 3 to 5, the front section 13 and/or the back section 14 comprise indentations 22 in the form of protrusions 23 extending from a channel wall 24 into the front section 13 and/or the back section 14 of the waveguide channel segment 11; wherein the waveguide apertures 17 in the region of their rear end 25 have a cross-section 26 with a longer extension 27 and a shorter extension 28. The shown waveguide channel segments 11 have a front section 13 and a back section 14 which are arranged in the antenna plate 2. The cross-section 26 of the shown waveguide channel segment 11 is essentially rectangular. To improve the radiation efficiency, the front section 13 can alternatively have a bigger cross-section than the back section 14. The front 13 and back section 14 don't have to be symmetrically with respect to the parting plane 36. In a variation with an antenna plate 2 comprising a front 8 and a back part 5, the parting plane 36 between the front 8 and the back part 5 can divide the waveguide channel segment 11 in two halves. Nevertheless, the half of the front section 13 and the half of the back section 14 don't have to be symmetrically with respect to the parting plane 36. The shown waveguide channel segment 11 extends in a first direction x parallel to the front face 3 in the antenna plate 2. The waveguide channel segment 11 of the shown variation comprises a rectangular cross section, as said in the general description the cross-section 26 can alternatively be out of the group of the following geometries or a combination thereof: Rectangle, rhomb, ellipse, circle, wherein a main extension direction of the cross section 26 is essentially parallel to the first direction x. For exciting or receiving a signal, the shown antenna device 1 comprises waveguide apertures 17 which are arranged in the antenna plate 2. The shown waveguide apertures 17 extend between and interconnect the front section 13 of the waveguide channel segment 11 and the front face 3 of the antenna plate 2. The shown variation of the antenna device 1 comprises several waveguide apertures 17 which extend between and interconnect the front section 13 of one waveguide channel segment 11 and the front face 3 forming an array 20 of waveguide apertures 17. The waveguide apertures 17 of an array 20 are preferably fed by a common waveguide channel 21 which is interconnected to a respective radiating element 39 at the back face 4 of the antenna plate 2. The shown waveguide apertures 17 are designed as slots. The shown waveguide apertures 17 have a cross-section 26 with a longer extension 27 and a shorter extension 28 in the region of their rear end 25. In the shown variation the waveguide apertures 17 have an essentially rectangular cross-section 26, which is funnel shaped with a narrowing cross-section 26 towards the rear end 25 before they merge into the waveguide channel segment 11 or a section thereof.

Figure 6:
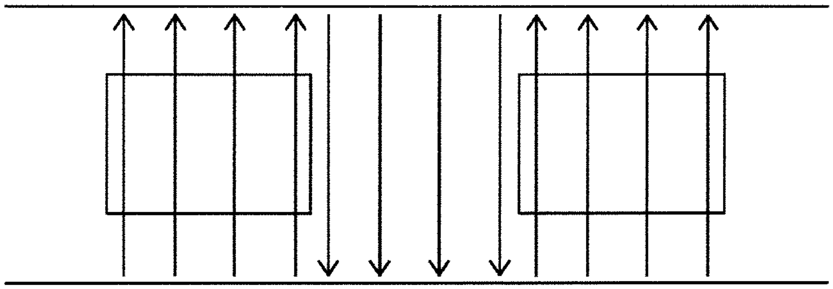
FIG. 6 shows a schematic orientation of the currents within the waveguide channel segment.

FIG. 6 shows a schematic orientation of the currents within the waveguide channel segment 11. The waveguide apertures 17 must be spaced with one guided wavelength A distance with respect to each other to keep a uniform phase between the waveguide apertures 17 as can be seen in FIG. 6. The distance between two neighboring waveguide apertures 17 is typically equivalent to more than one free space with a size of one guided wavelength A leading to excessive grating lobe levels. To be able to reduce the distance between neighboring waveguide apertures 17, third protrusions 34 can be arranged between the waveguide apertures 17 alternately in the back section 14 of the waveguide channel segment 11 with respect to the first direction x. The third protrusions 34 are configured to compress the guided wavelength λ along the first direction x within the waveguide channel segment 11. The third protrusions 34 can reduce the effective guided wavelength λ of the waveguide propagating mode. Therefore, the distance between neighboring waveguide apertures 17 can be reduced and mitigate the appearance of undesired grating lobes.

Figure 7A:
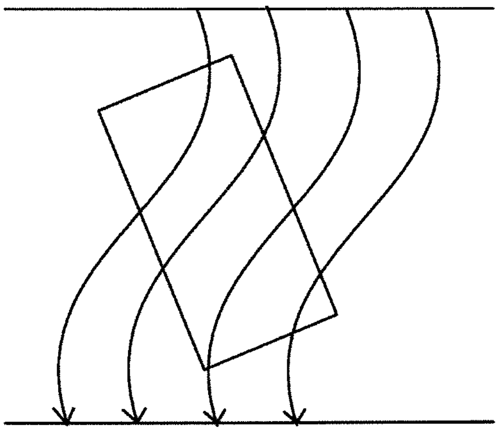
FIG. 7*a* shows a schematic orientation of the currents within the waveguide channel segment comprising a tilted waveguide aperture.
Figure 7B:
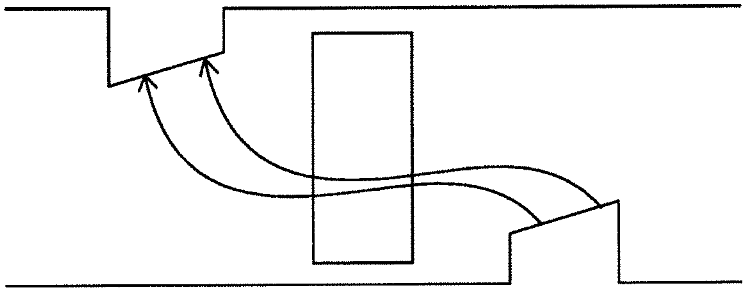
FIG. 7*b* shows a schematic orientation of the currents within the waveguide channel segment comprising first protrusions.

FIG. **7*a* shows a schematic orientation of the currents within the waveguide channel segment 11 comprising a tilted waveguide aperture 17. The approach of tilting the waveguide apertures 17 with respect to the first direction x is known from antenna devices with a waveguide structure. Nevertheless, arranging the waveguide apertures 17 tilted or angularly displaced in order to excite the signal through the waveguide apertures 17 creates an undesired horizontal polarization. To avoid the undesired horizontal polarization, first protrusions 29 can be arranged as shown in FIG. 7*b*. The shown wedge shaped first protrusions 29 are arranged in the front section 13 of the waveguide channel segment 11. As can be seen, the trapezoid cross-section of the first protrusions 29 can perturb the field such that the signal is radiated by the waveguide aperture 17. By arranging the longer extension 27 of the cross-section perpendicular to the first direction x, the waveguide apertures 17 would usually not excite a signal. The first protrusions 29 which perturb the currents enable the waveguide apertures 17 to radiate the signal. As shown, the first protrusions 29 are arranged alternately configured to compensate the 180° phase change between neighboring waveguide apertures 17, which are arranged at the waveguide channel segment 11** separated with half a guided wavelength λ distance.

Figure 8:
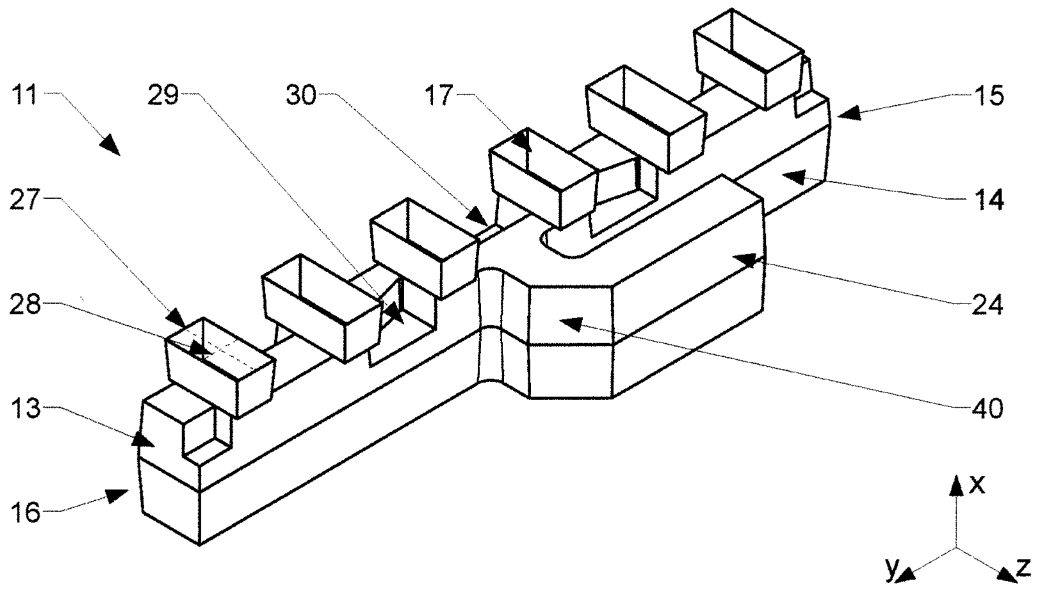
FIG. 8 shows a first variation of the waveguide channel segment in a perspective view.
Figure 9:
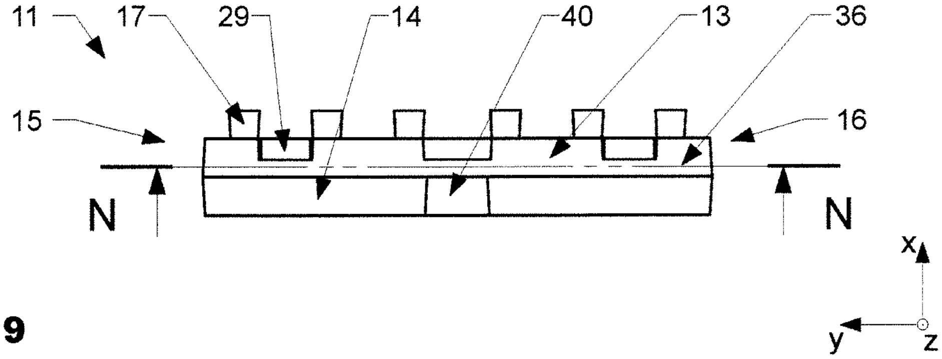
FIG. 9 shows a first variation of the waveguide channel segment from the side.
Figure 10:
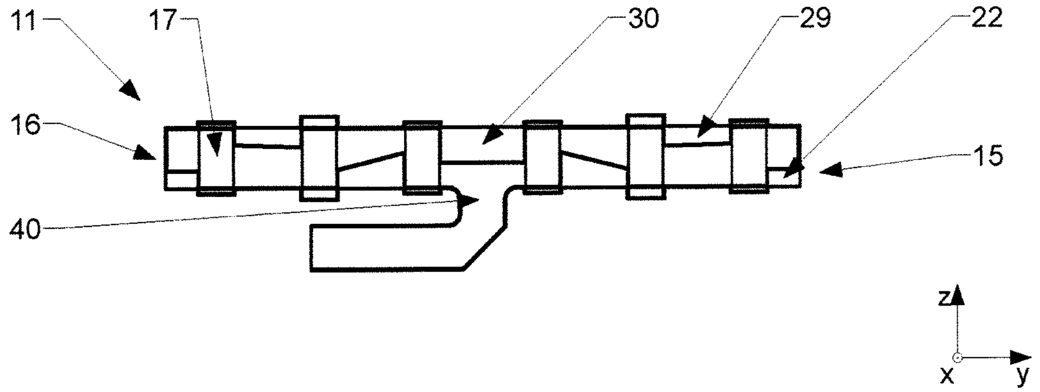
FIG. 10 shows a first variation of the waveguide channel segment as a sectional view.

FIGS. 8-10 show a first variation of the waveguide channel segment 11 whereby the longer extensions 27 of the cross-sections 13 are arranged perpendicular to the first direction x and the shorter extensions 28 are arranged parallel to the first direction x. Between the shown neighboring waveguide apertures 17 alternately first protrusions 29 are arranged in the front section 13 of the waveguide channel segment 11. The first protrusions 29 in form of wedge shaped indentations 22 extend from the channel wall 24 into the front section 13 of the waveguide channel segment 11. The shown indentations 22 are designed as an inwardly directed protrusion 23 or alternatively in form of a septum which is arranged in the channel wall 24. The shown indentations 22 are configured to help dividing the signal between the left 15 and the right section 16 of the waveguide channel segment 11 and/or to perturb the field. In the shown variation a second protrusion 30 is arranged at a center point between the left 15 and the right section 16 of the waveguide channel segment 11, such that the signal, respectively its power, is split equally between the left 15 and the right section 16 of the waveguide channel segment 11. The alternately arranged edge shaped first protrusions 29 in the front section 13 create a saw tooth pattern. The shown first protrusions 29 perturb the currents such that the waveguide apertures 17 can radiate a signal. The alternately arrangement of the first protrusions 29 is configured to compensate the 180° phase change between neighboring waveguide apertures 17. In the shown variation the waveguide apertures 17 are arranged at the waveguide channel segment 11 separated with half a guided wavelength distance. As can be seen from the figures, the cross section 26 of the waveguide apertures 17 is essentially rectangular. As the waveguide aperture 17 radiation coupling is proportional to the size of the first protrusions 29, their shape can be varied to tune the amplitude of the waveguide apertures 17 and influence their radiation pattern. In addition, the length of the longer extension 27 can be adjusted to alter the excitation phase of the waveguide aperture17. In the shown variation waveguide apertures 17 with differing longer extensions 27 are arranged alternately. Waveguide apertures 17 with longer 27 and a shorter extension 28 are arranged alternately, which can be useful for tuning the radiation pattern.

Figure 11:
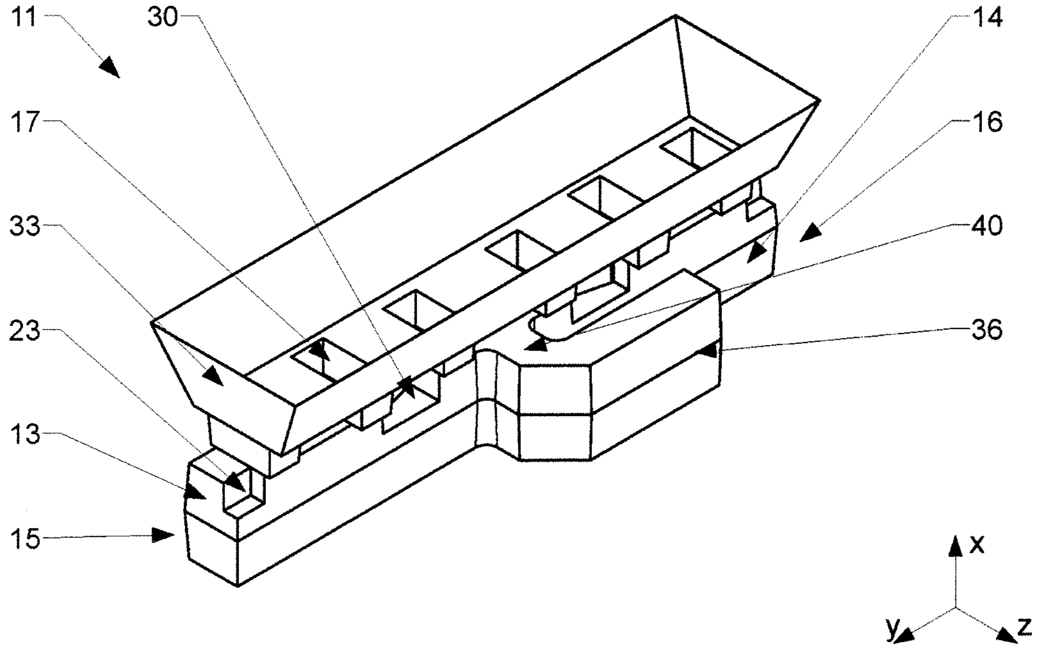
FIG. 11 shows the first variation of the waveguide channel segment in a perspective view with a funnel cavity.
Figure 12:
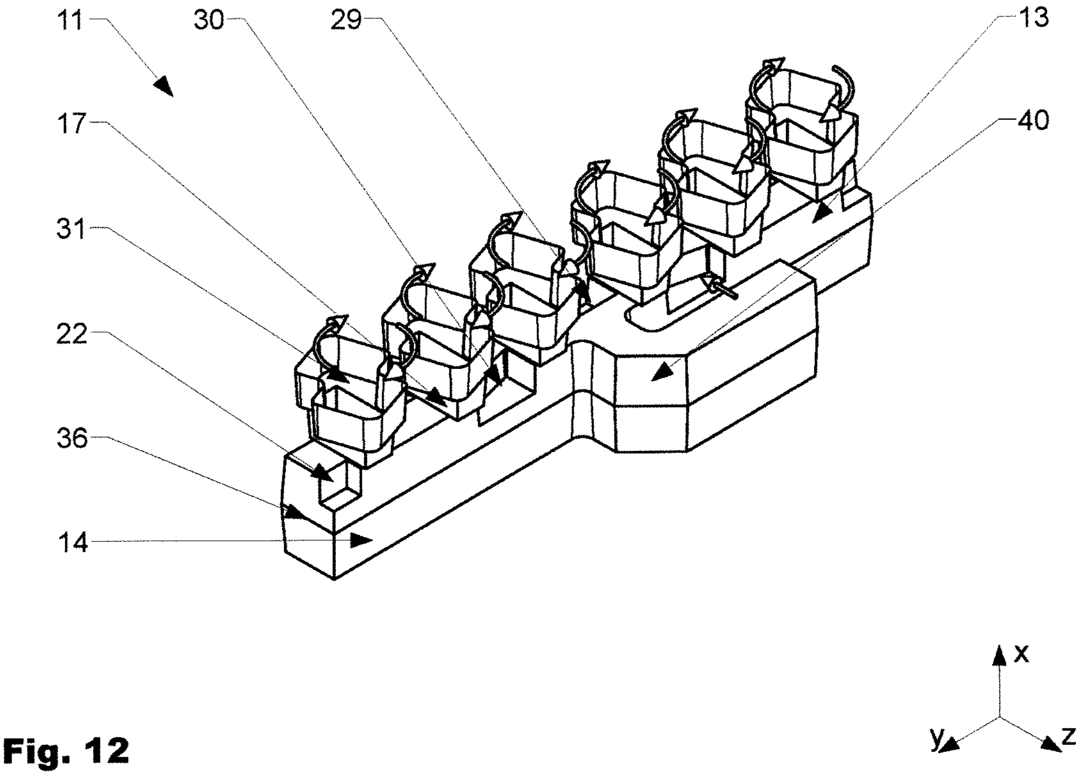
FIG. 12 shows show the first variation of the waveguide channel segment with polarization elements.

FIG. 11 shows the first variation of the waveguide channel segment 11 with a funnel shaped cavity 33. The shown funnel shaped cavity 33 is arranged at the front end of the waveguide apertures 17 and horn shaped, configured to tune the radiation pattern to focus the field and to reduce the beamwidth in one of the main radiation planes. In the shown variation the funnel cavity 33 is arranged symmetrically with respect to the first axis x. Alternatively, the funnel shaped horn cavity 33 can be arranged laterally displaced to influence the directivity. The waveguide channel segment 11 can also comprise two arrays 20 of waveguide apertures 17. FIG. 12 shows the first variation of the waveguide channel segment 11 with a polarization element 31. The shown polarization element 31 is arranged at a front end 19 of each waveguide slot 8 which is configured to split the field into two orthogonal polarizations with a relative 90° phase shift. The shown polarization element 31 is essentially shaped like two diagonally partially overlapping squares or a bow tie. The polarization element 31 can split the polarization of the excited field into two orthogonal polarizations with a relative 90° phase shift with respect to each other. The polarization element 31 is configured to twist the vertical polarized field which is excited by the waveguide aperture 17 by transforming the vertical polarization of each waveguide aperture 17 into circular polarization. The first protrusions 29 arranged at the front section 13 of the waveguide channel segment 11 is still required such that the waveguide apertures 17 can excite and couple the energy to the polarization element 31 with the desired relative amplitude.

Figure 13:
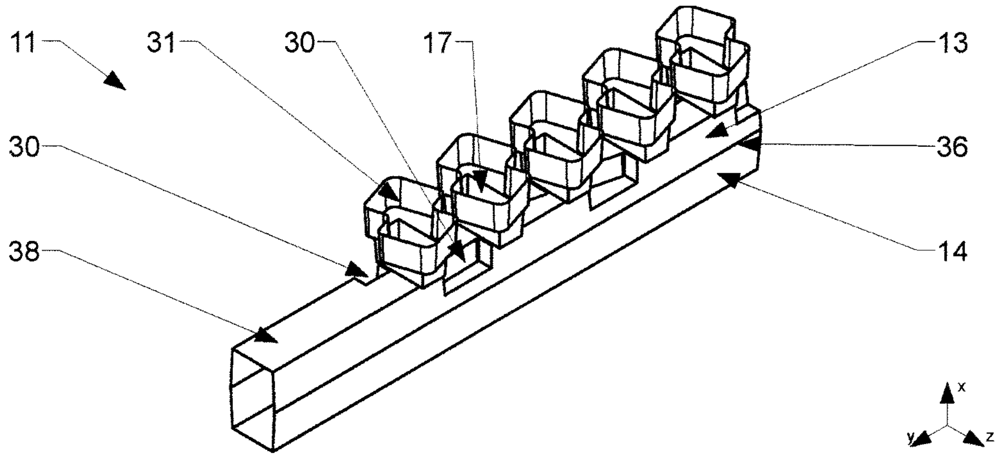
FIG. 13 shows the first variation of the waveguide channel segment in a perspective view with a first variation of the feeding port.
Figure 14:
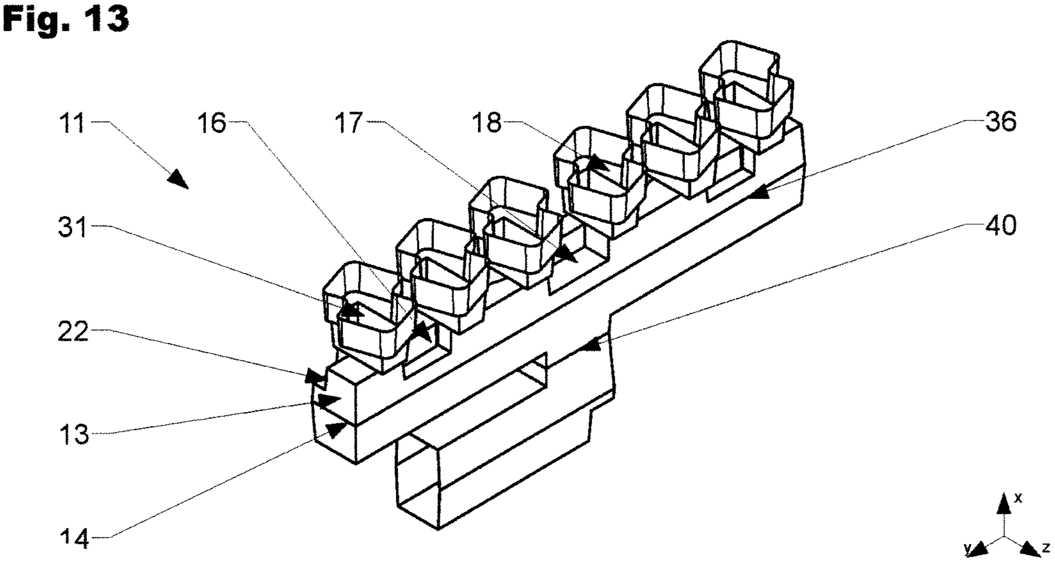
FIG. 14 shows the first variation of the waveguide channel segment in a perspective view with a second variation of the feeding port.
Figure 15:
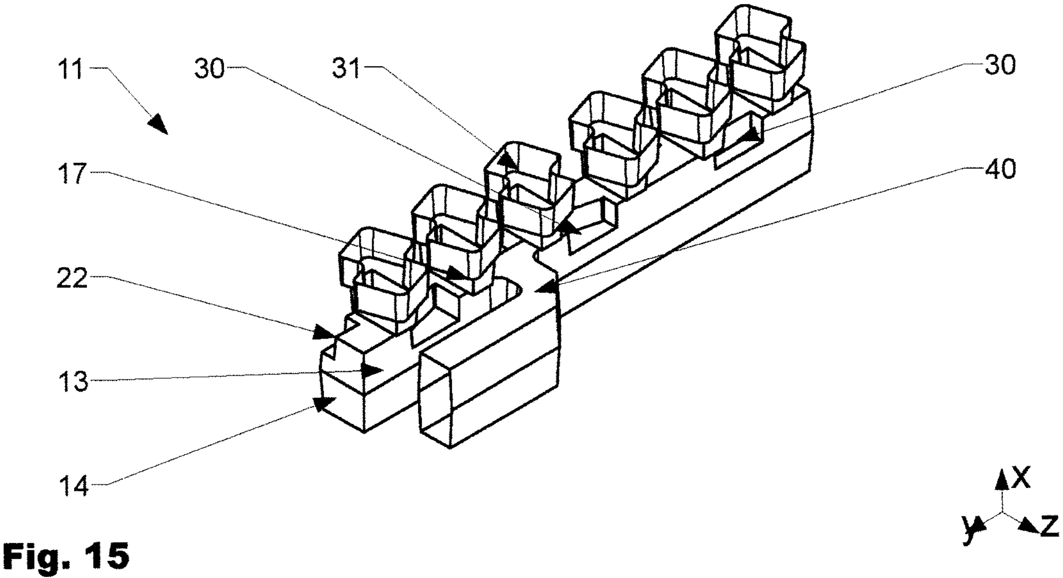
FIG. 15 shows the first variation of the waveguide channel segment in a perspective view with a third variation of the feeding port.

FIGS. 13-15 show three variations of the first variation of the waveguide channel segment 11 with different variations of the feeding port 38. All three shown variations of the feeding port 38 interconnect the waveguide channel segment 11 to an aperture 39 at the back face 4 of the antenna plate 2. The first variation of the feeding port 38, shown in FIG. 13, wherein the waveguide channel segment 11 is fed from the side leads to a very compact design but the asymmetry reduces the bandwidth and generates beams squint. To avoid these effects, the feeding port 38 can be designed as a splitter 40 as shown by FIG. 14, which is arranged between the left 15 and the right 16 section of the waveguide channel segment 11, configured to separate or combine the signal. Bottom feeding: leads to very compact and broadband design but requires an additional layer of routing below. Hybrid feeding may in some cases not be possible to feed the radiator from the center due to small separation with the neighboring elements. Alternatively, center feeding via a splitter 40 as shown in FIG. 15 allows the routing to be in the same layer, but it is less compact.

Figure 16:
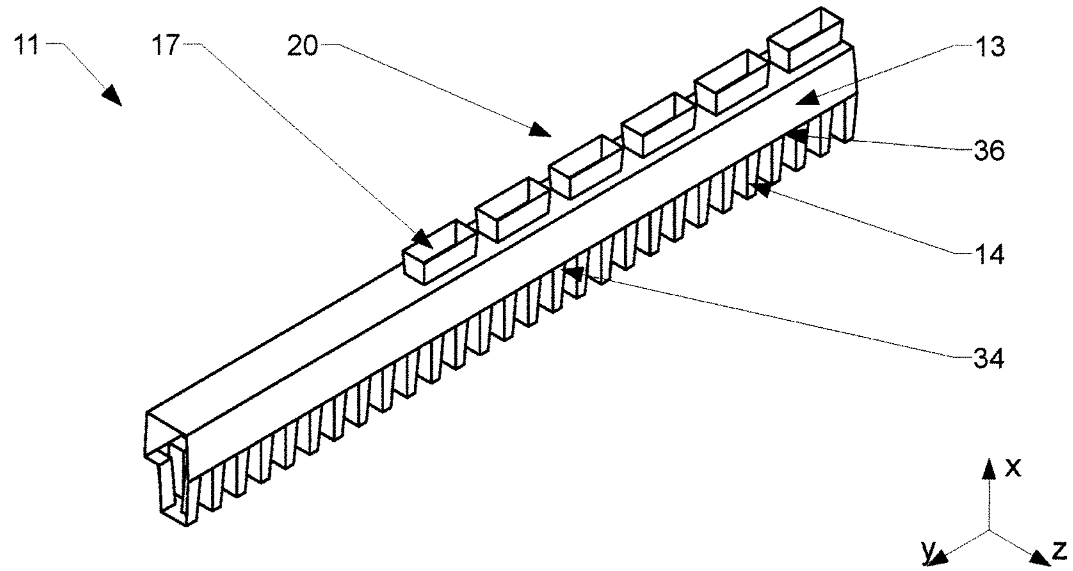
FIG. 16 shows a second variation of the waveguide channel segment in a perspective view.
Figure 17:
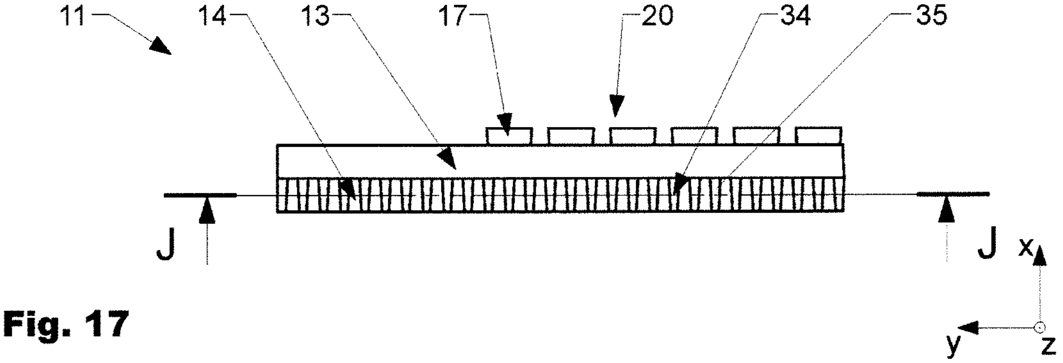
FIG. 17 shows a second variation of the waveguide channel segment from the side.
Figure 18:
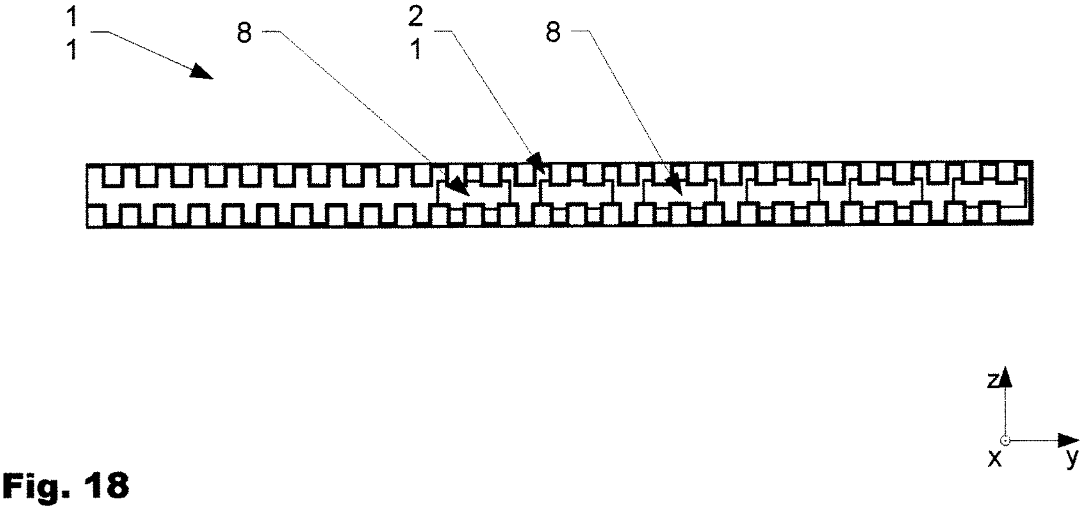
FIG. 18 shows a second variation of the waveguide channel segment as a sectional view.

FIGS. 16-18 show a second variation of the waveguide channel segment 11. In the shown variation the longer extension 27 of the cross-section 26 is arranged parallel to the first direction x and the shorter extension 28 is arranged perpendicular to the first direction x. In known antenna devices 1 the waveguide apertures 17 must be spaced with one guided waveguide distance with respect to each other to keep a uniform phase between the waveguide apertures 17. The distance between two neighboring waveguide apertures 17 is typically equivalent to more than one free space with a size of one guided wavelength leading to excessive grating lobe levels. The shown third protrusions 34 are arranged between the waveguide apertures 17 alternately in the back section 14 of the waveguide channel segment 11 with respect to the first direction x, wherein the third protrusions 34 are configured to compress the guided wavelength in the first direction x within the waveguide channel segment 11. The third protrusions 34 reduce the effective wavelength of the waveguide propagating mode. As can be seen the distance between neighboring waveguide apertures 17 is reduced and the appearance of undesired grating lobes is mitigated. The shown third protrusions 34 are designed as pillars 35 extending perpendicular to the front face 3 of the antenna plate 2 into the waveguide channel segment 11. They are spaced apart from each other in the first direction x in an, in one-dimension glide-symmetric arrangement and the waveguide apertures 17 are arranged with a distance of essentially one guided wavelength to one another along the first direction x. The number of pillars 35 arranged at the back section 14 of the waveguide channel segment 11 creates a dented profile. The third protrusions 34 introduce a periodic structure such that the propagation constant inside the waveguide channel segment 11 is increased. This allows to divide the guided wavelength with a factor of roughly two compared to the incoming wavelength.

Figure 19:
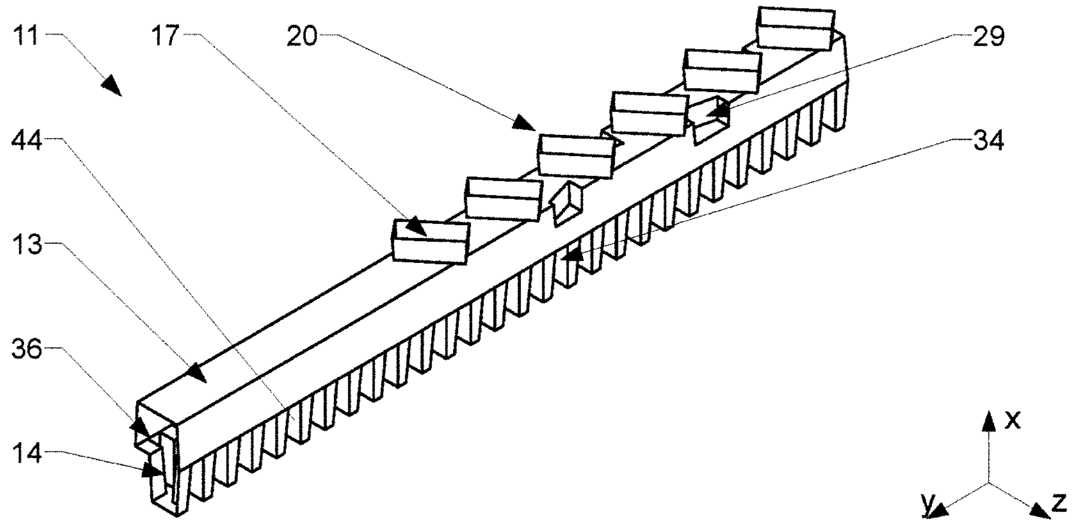
FIG. 19 shows a third variation of the waveguide channel segment in a perspective view.
Figure 20:
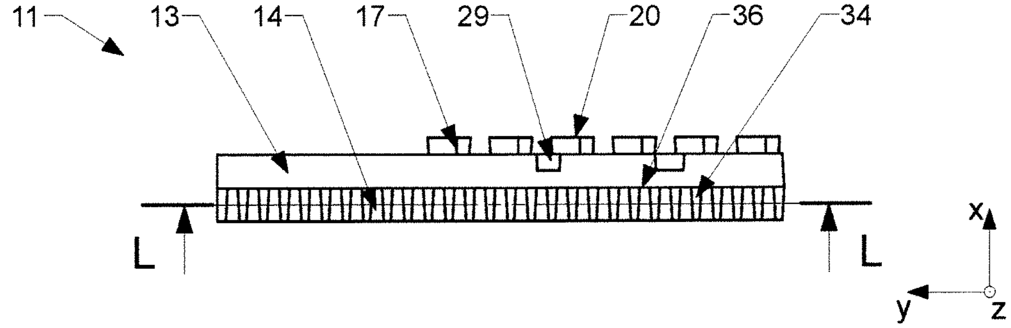
FIG. 20 shows a third variation of the waveguide channel segment from the side.
Figure 21:
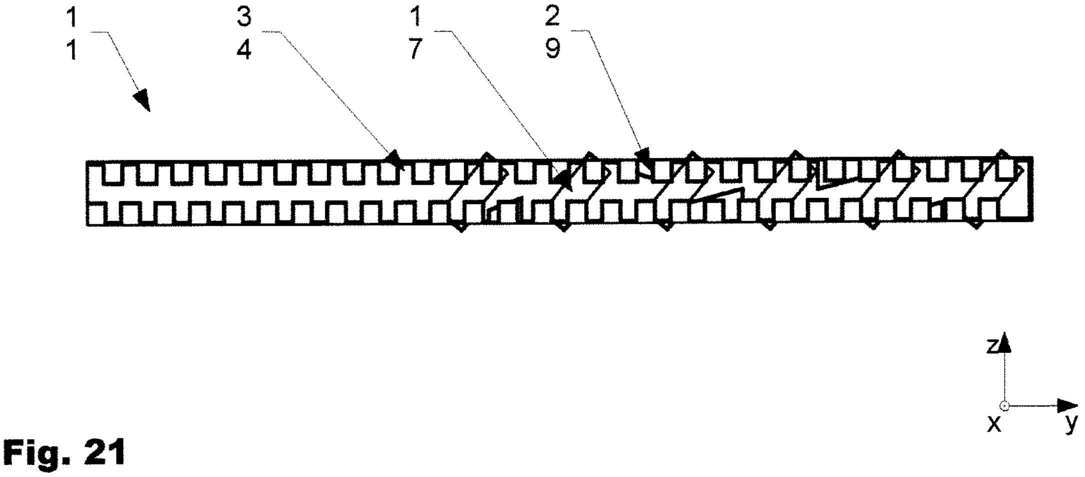
FIG. 21 shows a third variation of the waveguide channel segment as a sectional view.

FIGS. 19-21 show a third variation of the waveguide channel segment 11. In the variation the rectangular cross-section 26 is arranged angularly displaced by an angle α with respect to the first direction x of the waveguide channel segment 11. The polarization is thereby changed from pure horizontal) (0° or vertical) (90° polarization to a to slant) (+45° polarization. The polarization is preferably twisted by modified first protrusions 29, such that a smooth transition is achieved. The advantage of the shown variation is that the polarization can be changed without an additional antenna layer. The use of slant polarization is of high interest in automotive applications because it reduces interference between vehicles that are facing each other. Therefore, between neighboring waveguide apertures 17 alternately first protrusions 29 are arranged in the front section 13 of the waveguide channel segment 11. An addition, third protrusions 34 are arranged in the back section 14 of the waveguide channel segment 11 with respect to the first direction x.

Figure 22:
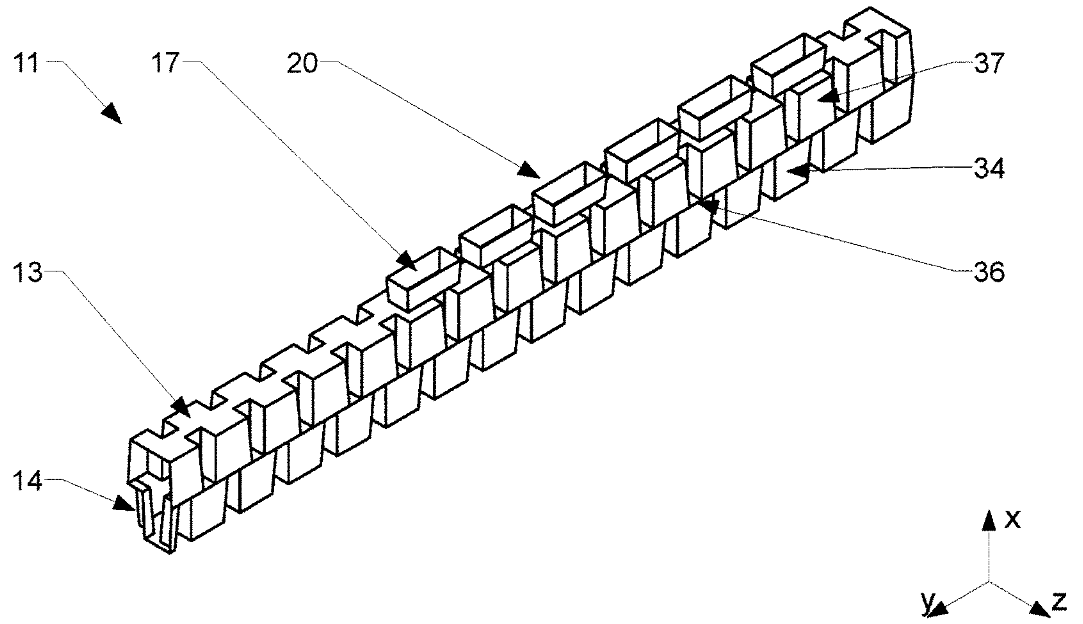
FIG. 22 shows a fourth variation of the waveguide channel segment in a perspective view.
Figure 23:
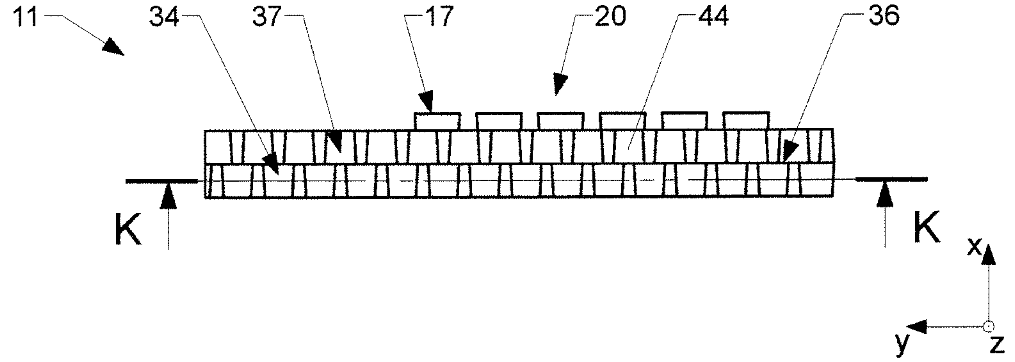
FIG. 23 shows a fourth variation of the waveguide channel segment from the side.
Figure 24:
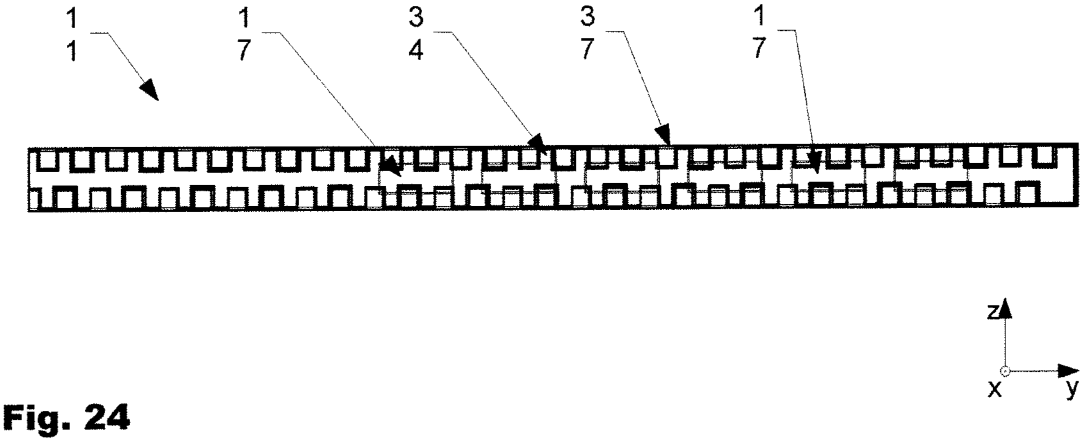
FIG. 24 shows a fourth variation of the waveguide channel segment as a sectional view.
Figure 25:
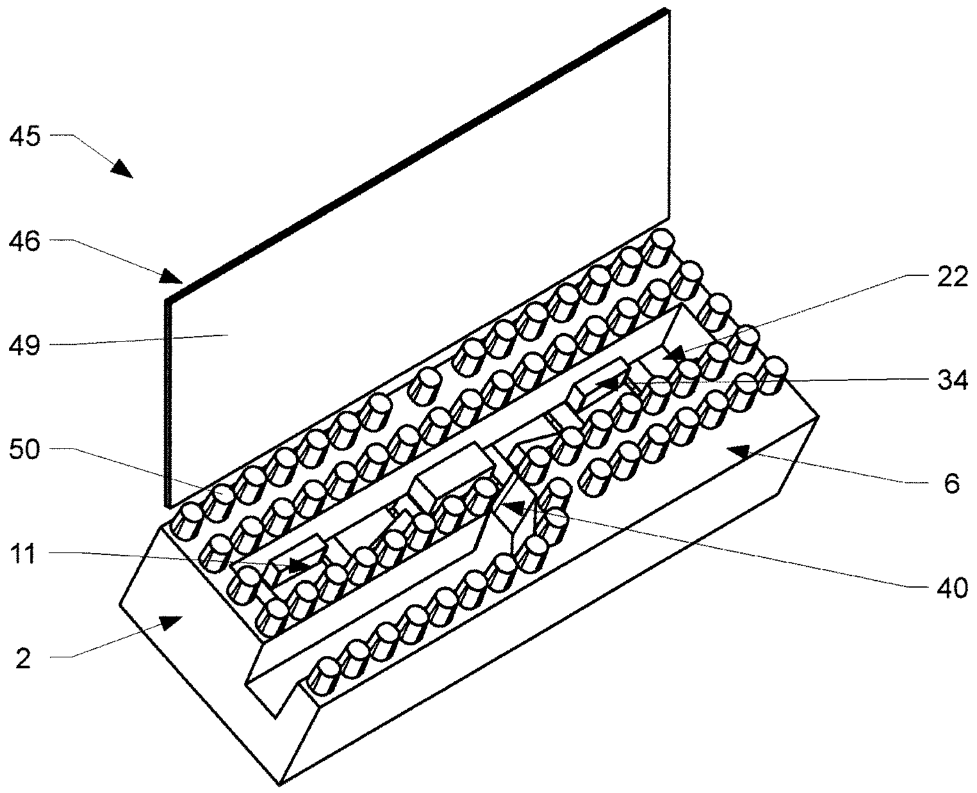
FIG. 25 shows a perspective view of a first variation of an antenna assembly with EBGs.
Figure 26:
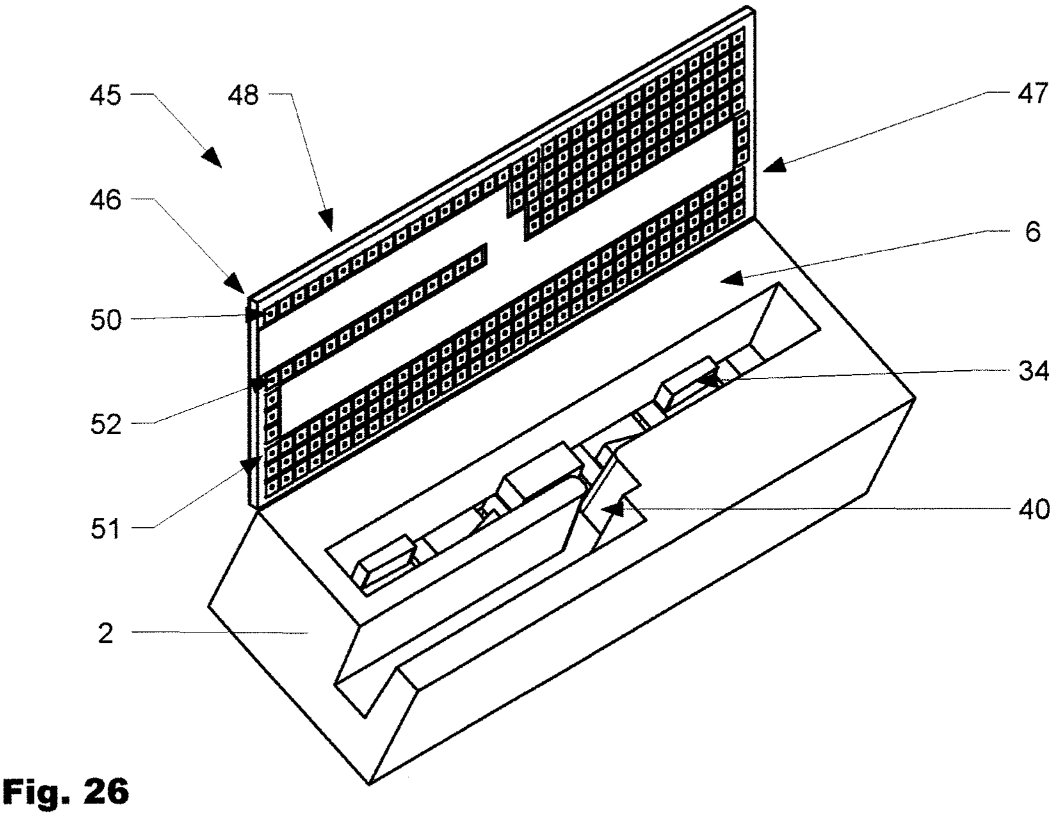
FIG. 26 shows a perspective view of a second variation of an antenna assembly with EBGs from the back and above.

FIGS. 22-24 show a fourth variation of the waveguide channel segment 11. Every second of the shown third protrusions 34 is folded upward by mirroring at a parting plane 36 as a fourth protrusion 37 in the front section 13. Thereby a glide-symmetric arrangement of the third 21 and the fourth 35 pillars in two dimensions results. FIGS. 25 and 26 show a perspective view of a first and a second variation of the antenna assembly. The shown antenna devices 1 both comprise only one layer. This is advantageously as the need to achieve an accurate alignment of the front and back part 5 is not an issue with a single pieced antenna plate 2. The single layered antenna plate 2 can be made by injection molding in only one production step. The shown antenna plates 2 comprise only one metallized plastic layer in combination with a printed circuit board (PCB) 46. To assembly the plastic layer and the PCB 46 together and avoid leakage of the power there are different alternatives: conductive glue, soldering, etc. As can be seen in FIG. 25, the antenna plate 2 of the second variation comprises a number of pillars 50 which are arranged at the back face 4 of the antenna plate 2 configured to define the contour of the waveguide channel segment 11. In the shown variation the waveguide channel segments 11 are at least partially replaced by a series of pillars 50 which are based on the gap waveguide technology. The shown pillars 50 at least partially form the outer contour of the waveguide channel segment 11 and/or the splitter 40. The pillars 50 are configured to guide the signal through the waveguide channel segment 11. The electromagnetic band gap (EBG) structures are arranged essentially around the hollow waveguide channel segment 11. An electromagnetic band gap structure allows to block electromagnetic waves at a given range of frequencies, behaving as a conductive wall without the need to have direct and/or ohmic contact. As can be best seen in FIG. 26 waveguide apertures 17 with smaller 18 and larger 19 openings can be arranged within one array of waveguide apertures 17. This configuration causes a tilt of the radiation pattern. Alternatively, the cross sections 26 of the waveguide apertures 17 of neighboring can be different, such that an array with waveguide apertures 17 with a smaller cross section 26 is arranged parallel to an array of waveguide aperture 17 with a larger cross section 26. Good results can be achieved when waveguide apertures 17 with smaller and larger cross sections 26 are arranged in a line next to each other in alternating manner.

Alternatively mushroom EBGs can be arranged on the PCB itself, as shown in the variation of FIG. 26. The shown mushroom EBGs are made of a coating which comprises metallized through holes 52. The mushroom EBGs are configured to create a periodic radiation pattern. In the shown variation of FIG. 26, the printed circuit board 46 comprises electromagnetic band gab structures, wherein the printed circuit board 46 is interconnected to the antenna plate 2 comprising mushroom-shaped electromagnetic band gap elements 51. The shown mushroom-shaped electromagnetic band gap elements 51 extend from the back face 48 of the PCB 46 and/or through the body of the PCB 46 and are arranged in between respectively around the waveguide channel segment 11, thereby improving the electromagnetic isolation respectively decoupling. In case that more directive or complex radiation patterns are required, multiple arrays of waveguide apertures 17 can be arranged in the front face 3 of the antenna plate 2. This can be seen in FIGS. 27 to 30.

Figure 27:
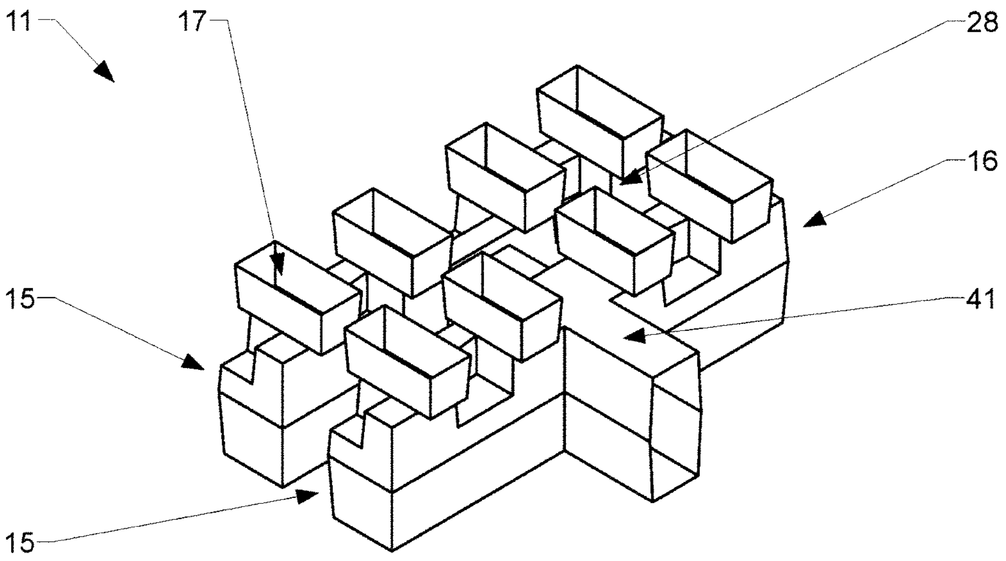
FIG. 27 shows a fifth variation of the waveguide channel segment with a central feeding channel in a perspective view.
Figure 28:
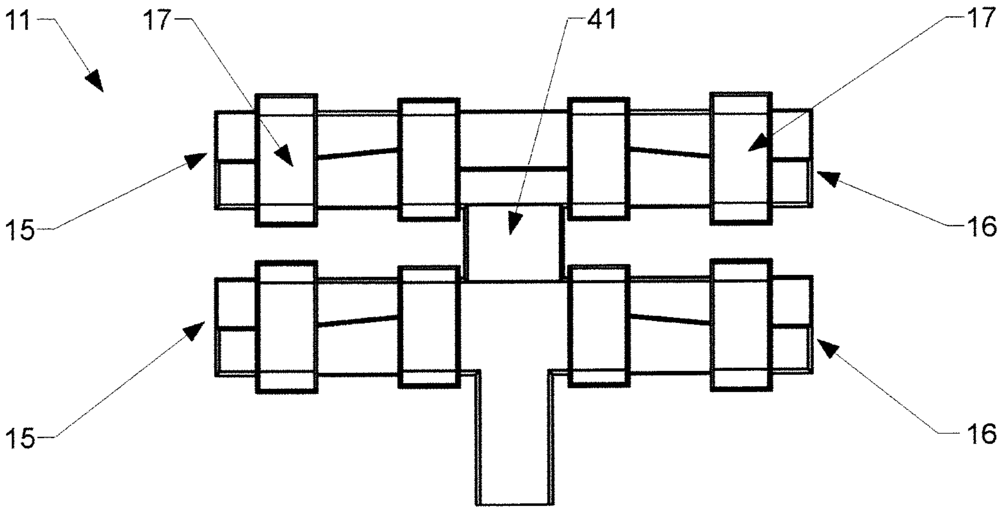
FIG. 28 shows a fifth variation of the waveguide channel segment with a central feeding channel from above.

FIGS. 27 and 28 show a fifth variation of the waveguide channel segment 11 with a central feeding channel. The feeding port 38 is designed as a central feeding channel 30, wherein a number of left 15 and right 16 sections of multiple waveguide channel segments 11 are arranged essentially perpendicular with respect to the central feeding channel 30 and parallel with respect to each other. The proximal left 15 and right 16 sections and distal left 15 and right 16 sections are arranged at the central feeding channel 30, wherein the distal left 15 and right 16 sections are fed with a phase shift such that a beam tilt is created. The shown first 42 and second 43 columns of arrays 20 are arranged essentially perpendicular with respect to the central feeding channel 41. Preferably the distal second 43 columns are fed with a phase shift with respect to the proximal first 42 columns. The phase shift causes tilted radiation patterns. In the shown variation, the arrays of waveguide apertures 17 are arranged parallel with respect to each other. The cross sections 26 of the waveguide apertures 17, especially the length of the longer extension 27 varies.

Figure 29:
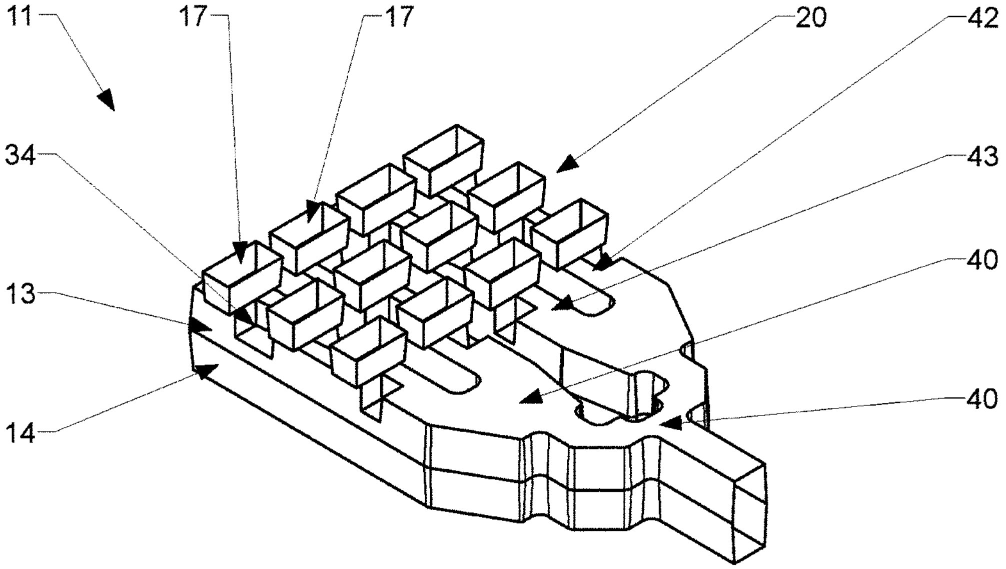
FIG. 29 shows a sixth variation of the waveguide channel segment with an array of splitters in a perspective view.
Figure 30:
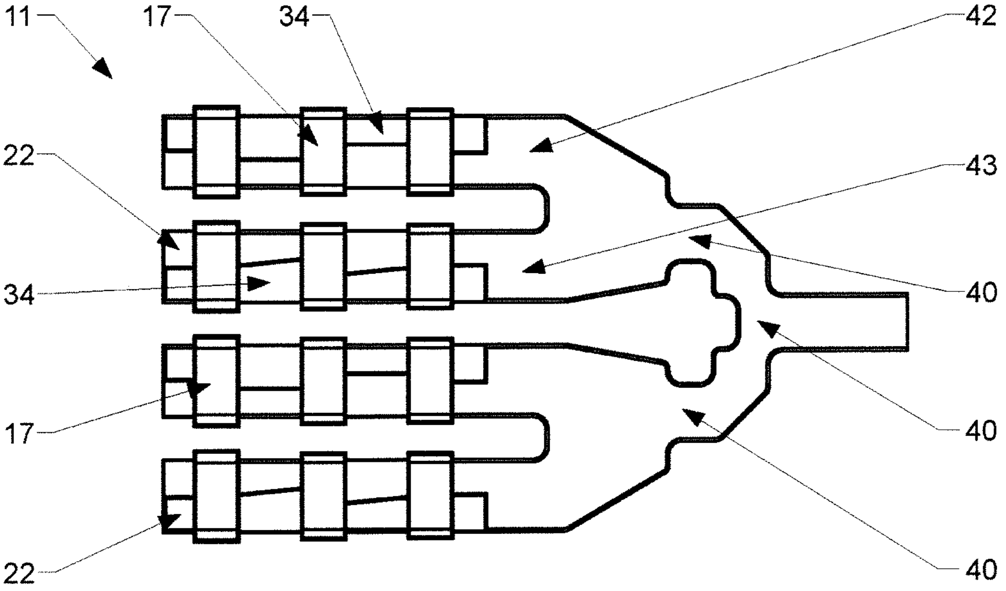
FIG. 30 shows a sixth variation of the waveguide channel segment with an array of splitters from above.

FIGS. 29 and 30 show a sixth variation of the waveguide channel segment 11 with an array of splitters 40. The shown feeding port 38 comprises an array of splitters 40, wherein waveguide channel segments 11 are interconnected to the splitters 40 of the array of splitters 40, which are interconnected to the array of splitters 40 and are arranged parallel with respect to each other. In the shown variation an array of splitters 40 is arranged wherein waveguide channel segments 11 are interconnected to the splitters 40 of the array of splitters 40. Multiple waveguide channel segments 11 with an array of waveguide apertures 17 each, are interconnected to the array of splitters 40. In the shown variation at least two waveguide channel segments 11 are connected to each splitter 40 of the array of splitters 40. This design is known as corporate network. The corporate network is designed in a manner such that the waveguide channel segments 11 connected to one common splitter 40 are fed with equal amplitude and phase for maximum directivity.

The invention claimed is:

1. An antenna device comprising:

a. an antenna plate having a front face and a back face;

b. at least one waveguide channel segment having a front section and a back section arranged in the antenna plate extending in a first direction parallel to the front face in the antenna plate;

c. waveguide apertures arranged in the antenna plate extending between and interconnecting the front section of the waveguide channel segment and the front face of the antenna plate;

d. at least one of the front section and the back section comprise indentations in the form of protrusions extending from a channel wall into at least one of the front section and the back section of the waveguide channel segment;

e. wherein the waveguide apertures in the region of their rear end have a cross-section with a longer extension and a shorter extension;

f. wherein the longer extension of the cross-section is arranged essentially perpendicular to the first direction and the shorter extension is arranged essentially parallel to the first direction; wherein g. between neighboring waveguide apertures alternately first protrusions are arranged in the front section of the waveguide channel segment; and h. wherein the first protrusions have a trapezoid cross-section, the first protrusions being configured to perturb the field such that the signal is radiated vertically polarized.

2. The antenna device according to claim 1, wherein at least one second protrusion having a rectangular cross-section is arranged in the front section of the waveguide channel segment to divide the signal in the waveguide channel segment to excite in a left section and a right section extending along the first direction.

3. The antenna device according to claim 1, wherein the first protrusions are configured to compensate a 180° phase change between adjacent waveguide apertures, which are arranged with a distance of essentially half a guided wavelength with respect to each other.

4. The antenna device according to claim 1, wherein a polarization element is arranged at a front end of each waveguide aperture which is configured to split the field into two orthogonal polarizations with a relative 90° phase shift.

5. The antenna device according to claim 4, wherein the polarization element is essentially shaped like two diagonally partially overlapping squares or a bow tie.

6. The antenna device according to claim 1, wherein a funnel shaped horn cavity is arranged at the front end of the waveguide apertures configured to tune the radiation pattern to focus the field and to reduce the beamwidth in at least one of the main radiation planes.

7. The antenna device according to claim 6, wherein the funnel shaped horn cavity is arranged in an asymmetric manner laterally displaced with respect to the first direction to achieve an asymmetric radiation pattern.

8. The antenna device according to claim 1, wherein a feeding port interconnects the waveguide channel segment to an aperture at the back face of the antenna plate.

9. The antenna device according to claim 8, wherein the feeding port comprises a splitter arranged between a first column and a second column, configured to separate or combine the signal.

10. The antenna device according to claim 9, wherein the feeding port comprises an array of splitters, which are interconnected to each other and are arranged parallel with respect to each other.

11. The antenna device according to claim 8, wherein the feeding port is designed as a central feeding channel, wherein a number of left and right sections of multiple waveguide channel segments are arranged essentially perpendicular with respect to the central feeding channel and parallel with respect to each other.

12. The antenna device according to claim 11, wherein proximal left and right sections and distal left and right sections are arranged at the central feeding channel, wherein the distal left and right sections are fed with a phase shift such that a beam tilt is created.

13. The antenna device according to claim 1, wherein the antenna plate comprises only one layer, wherein a number of pillars are arranged at the back face, which are configured to define the contour of the waveguide channel segment.

14. The antenna device according to claim 1, wherein the antenna plate comprises only one layer, wherein a printed circuit board is interconnected to the antenna plate comprising mushroom-shaped electromagnetic band gap elements.

15. An antenna assembly comprising the antenna device according to claim 1 and a printed circuit board and a thereon arranged electronic component interconnected to the antenna plate.

16. An antenna device comprising:

a. an antenna plate having a front face and a back face;

b. at least one waveguide channel segment having a front section and a back section arranged in the antenna plate extending in a first direction parallel to the front face in the antenna plate;

c. waveguide apertures arranged in the antenna plate extending between and interconnecting the front section of the waveguide channel segment and the front face of the antenna plate;

d. at least one of the front section and the back section comprise indentations in the form of protrusions extending from a channel wall into at least one of the front section and the back section of the waveguide channel segment;

e. wherein the waveguide apertures in the region of their rear end have a cross-section—with a longer extension and a shorter extension; wherein f. the longer extension of the cross-section is arranged essentially parallel to the first direction and the shorter extension is arranged essentially perpendicular to the first direction; and wherein g. between the waveguide apertures third protrusions are arranged alternately in the back section of the waveguide channel segment with respect to the first direction, wherein the third protrusions are configured to compress the guided wavelength in the first direction within the waveguide channel segment.

17. The antenna device according to claim 16, wherein the third protrusions comprise pillars extending perpendicular to the front face of the antenna plate into the waveguide channel segment, and spaced apart from each other in the first direction in an, in one-dimension glide-symmetric arrangement and the waveguide apertures are arranged with a distance of essentially one guided wavelength to one another along the first direction.

18. The antenna device according to claim 16 wherein every second of a third protrusion is folded upward by mirroring at a parting plane—as a fourth protrusion in the front section, such that in two dimensions a glide-symmetric arrangement of the third and the fourth protrusions results.

19. An antenna device comprising a. an antenna plate having a front face and a back face;

b. at least one waveguide channel segment having a front section and a back section arranged in the antenna plate extending in a first direction parallel to the front face in the antenna plate;

c. waveguide apertures arranged in the antenna plate extending between and interconnecting the front section of the waveguide channel segment and the front face of the antenna plate;

d. at least one of the front section and the back section comprise indentations in the form of protrusions extending from a channel wall into at least one of the front section and the back section of the waveguide channel segment; wherein e. the waveguide apertures in the region of their rear end have a cross-section with a longer extension and a shorter extension; and wherein f. the cross-section is arranged angularly displaced by an angle $\alpha$ with respect to the first direction of the waveguide channel segment;

g. between neighboring waveguide apertures alternately first and second protrusions are arranged in the front section of the waveguide channel segment; and h. between waveguide apertures third protrusions are arranged alternately in the back section of the waveguide channel segment with respect to the first direction.

* * * * *